(12) United States Patent
Araki et al.

(10) Patent No.: US 8,391,109 B2
(45) Date of Patent: Mar. 5, 2013

(54) METHOD OF MANUFACTURING HEAT-ASSISTED MAGNETIC RECORDING HEAD WITH INTERNAL MIRROR

(75) Inventors: Hironori Araki, Milpitas, CA (US);
Yoshitaka Sasaki, Milpitas, CA (US);
Hiroyuki Ito, Milpitas, CA (US);
Shigeki Tanemura, Milpitas, CA (US);
Kazuo Ishizaki, Milpitas, CA (US);
Takehiro Horinaka, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/538,996

(22) Filed: Jun. 29, 2012

(65) Prior Publication Data
US 2012/0269048 A1 Oct. 25, 2012

Related U.S. Application Data

(62) Division of application No. 12/654,553, filed on Dec. 23, 2009, now Pat. No. 8,243,560.

(51) Int. Cl.
*G11B 11/00* (2006.01)
(52) U.S. Cl. ............... 369/13.33; 369/13.13; 29/603.07
(58) Field of Classification Search ............... 369/13.33, 369/13.13, 13.32, 13.02, 112.09, 112.14, 369/112.21, 112.27, 300; 360/59; 385/129, 385/31, 88–94; 29/603.07–603.27; 250/201.3, 250/201.5
See application file for complete search history.

(56) References Cited

U.S. PATENT DOCUMENTS

| | | | |
|---|---|---|---|
| 7,852,713 B2 | 12/2010 | Nishida et al. | |
| 7,921,436 B2 | 4/2011 | Shimizu et al. | |
| 8,065,787 B2 | 11/2011 | Sasaki et al. | |
| 2004/0001394 A1* | 1/2004 | Challener et al. | 369/13.33 |
| 2005/0041950 A1* | 2/2005 | Rottmayer et al. | 369/13.33 |
| 2006/0233062 A1 | 10/2006 | Bedillion et al. | |
| 2007/0165494 A1 | 7/2007 | Cho et al. | |
| 2007/0165495 A1* | 7/2007 | Lee et al. | 369/13.33 |
| 2008/0002298 A1 | 1/2008 | Sluzewski | |
| 2008/0055762 A1 | 3/2008 | Shimazawa et al. | |
| 2011/0002199 A1* | 1/2011 | Takayama et al. | 369/13.33 |
| 2011/0013497 A1 | 1/2011 | Sasaki et al. | |
| 2011/0058273 A1 | 3/2011 | Sasaki et al. | |
| 2011/0096435 A1 | 4/2011 | Sasaki et al. | |
| 2011/0141862 A1 | 6/2011 | Arai et al. | |
| 2011/0188354 A1 | 8/2011 | Sasaki et al. | |
| 2011/0310713 A1 | 12/2011 | Komura et al. | |

OTHER PUBLICATIONS

U.S. Appl. No. 12/654,553, filed Dec. 23, 2009.

* cited by examiner

*Primary Examiner* — Tan X Dinh
(74) *Attorney, Agent, or Firm* — Oliff & Berridge, PLC

(57) ABSTRACT

A manufacturing method for a heat-assisted magnetic recording head includes the step of forming an internal mirror that includes a reflecting film support body and a reflecting film. The reflecting film support body includes first and second inclined surfaces. The reflecting film includes first and second portions that are located on the first and second inclined surfaces, respectively. The step of forming the internal mirror includes the step of forming the reflecting film support body and the step of forming the reflecting film. The step of forming the reflecting film support body forms an initial support body, and performs two taper-etching processes on the initial support body so that the initial support body is provided with the first and second inclined surfaces.

10 Claims, 24 Drawing Sheets

METHOD OF MANUFACTURING HEAT-ASSISTED MAGNETIC RECORDING HEAD WITH INTERNAL MIRROR

This is a Division of application Ser. No. 12/654,553 filed Dec. 23, 2009. The disclosure of the prior application is hereby incorporated by reference herein in its entirety.

BACKGROUND OF THE INVENTION

1. Field of the Invention

The present invention relates to a heat-assisted magnetic recording head for use in heat-assisted magnetic recording where a recording medium is irradiated with near-field light to lower the coercivity of the recording medium for data recording.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) for reading and a recording head including an induction-type electromagnetic transducer for writing are stacked on a substrate. In a magnetic disk drive, the thin-film magnetic head is provided in a slider which flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a technique so-called heat-assisted magnetic recording. This technique uses a recording medium having high coercivity. When recording data, a magnetic field and heat are simultaneously applied to the area of the recording medium where to record data, so that the area rises in temperature and drops in coercivity for data recording. The area where data is recorded subsequently falls in temperature and rises in coercivity to increase the thermal stability of magnetization.

In heat-assisted magnetic recording, near-field light is typically used as a means for applying heat to the recording medium. A known method for generating near-field light is to irradiate a plasmon antenna, which is a small piece of metal, with laser light. The plasmon antenna has a near-field light generating part which is a sharp-pointed part for generating near-field light. The laser light applied to the plasmon antenna excites surface plasmons on the plasmon antenna. The surface plasmons propagate to the near-field light generating part of the plasmon antenna, and the near-field light generating part generates near-field light based on the surface plasmons. The near-field light generated by the plasmon antenna exists only within an area smaller than the diffraction limit of light. Irradiating the recording medium with the near-field light makes it possible to heat only a small area of the recording medium.

In general, the laser light to be used for generating the near-field light is guided through a waveguide that is provided in the slider to the plasmon antenna that is located near the medium facing surface of the slider. Possible techniques of placement of a light source that emits the laser light are broadly classified into the following two. A first technique is to place the light source away from the slider. A second technique is to fix the light source to the slider.

The first technique is described in U.S. Patent Application Publication No. 2006/0233062 A1, for example. The second technique is described in U.S. Patent Application Publication No. 2008/0055762 A1 and U.S. Patent Application Publication No. 2008/0002298 A1, for example.

The first technique requires an optical path of extended length including such optical elements as a mirror, lens, and optical fiber in order to guide the light from the light source to the waveguide. This causes the problem of increasing energy loss of the light in the path. The second technique is free from the foregoing problem since the optical path for guiding the light from the light source to the waveguide is short.

The second technique, however, has the following problem. Hereinafter, the problem that can occur with the second technique will be described in detail. The second technique typically uses a laser diode as the light source. Laser light emitted from the laser diode can be made incident on the waveguide by a technique described in U.S. Patent Application Publication No. 2008/0055762 A1, for example. This publication describes arranging the laser diode with its emission part opposed to the incident end of the waveguide so that the laser light emitted from the emission part is incident on the incident end of the waveguide without the intervention of any optical element. According to this technique, the laser diode is arranged so that the longitudinal direction of the laser diode, i.e., the direction of the optical axis of the laser light to be emitted from the emission part, is perpendicular to the end face of the slider where the incident end of the waveguide is located. In such a case, the laser diode needs to be positioned with high precision so that the optical axis of the laser light emitted from the emission part will not tilt with respect to the optical axis of the waveguide. If the optical axis of the laser light emitted from the emission part tilts with respect to the optical axis of the waveguide, the laser light may fail to be delivered to the plasmon antenna with sufficient intensity. When the laser diode is to be arranged so that the longitudinal direction of the laser diode is perpendicular to the end face of the slider where the incident end of the waveguide is located, however, there is a problem that the longitudinal direction of the laser diode can easily tilt with respect to the direction perpendicular to the end face of the slider where the incident end of the waveguide is located, and it is thus difficult to align the laser light with the waveguide.

The laser light emitted from a laser diode may be made incident on the waveguide by other techniques. For example, as described in U.S. Patent Application Publication No. 2008/0002298 A1, the laser diode may be arranged with its emission part opposed to the surface of the slider on the trailing side so that the laser light emitted from the emission part is incident on the waveguide from above. This technique facilitates the alignment of the laser light with the waveguide.

U.S. Patent Application Publication No. 2008/0002298 A1 describes a magnetic head that includes a diffraction grating in its slider. The diffraction grating diffracts laser light that is emitted from a laser diode and enters the slider from above the slider, so that the diffracted laser light travels through the waveguide toward the medium facing surface. As a means for changing the traveling direction of the laser light, however, a mirror may be more advantageous than the diffraction grating because of its simpler structure. Providing an internal mirror in the slider is therefore conceivable, the internal mirror being intended for reflecting laser light coming from above the waveguide so that the reflected laser light travels through the waveguide toward the medium facing surface.

A method of fabricating such an internal mirror will now be discussed. In a possible method of fabricating the internal mirror, for example, an etching mask of photoresist is formed on an insulating layer of alumina or the like, and the insulating layer is taper-etched by reactive ion etching to provide the insulating layer with an inclined surface. A reflecting film of metal is then formed on the inclined surface by vapor deposition, sputtering, etc. The surface of the reflecting film serves as the reflecting surface for reflecting the laser light.

Hereinafter, a description will be given of problems that are associated with the foregoing method of fabricating the internal mirror. When taper-etching an insulating layer, the etching rate is typically lower than when etching the insulating layer perpendicularly. Given the same etching depth, an etching mask of greater thickness is therefore needed to taper-etch the insulating layer than when etching the insulating layer perpendicularly. Thicker etching masks, however, can lose their shape more easily due to plasma during etching. The foregoing method of fabricating the internal mirror therefore has the problem that it is difficult to form a plane inclined surface when fabricating an internal mirror having a reflecting surface of large dimension in the depth direction in particular, because of the deformation of the etching mask during the etching of the insulating layer for the purpose of forming the inclined surface. If the inclined surface is non-plane, the reflecting surface also becomes non-plane. This results in a drop in the amount of laser light that is reflected by the reflecting surface and travels in a desired direction, thereby causing the problem of low use efficiency of the laser light for generating near-field light.

OBJECT AND SUMMARY OF THE INVENTION

It is an object of the present invention to provide a heat-assisted magnetic recording head including an internal mirror for reflecting light that comes from above a waveguide and is used to generate near-field light so that the reflected light travels through the waveguide, the heat-assisted magnetic recording head being capable of preventing a drop in use efficiency of the light due to the internal mirror, and to provide a method of manufacturing such a heat-assisted magnetic recording head.

A heat-assisted magnetic recording head of the present invention includes: a medium facing surface that faces a recording medium; a magnetic pole that has an end face located in the medium facing surface, for producing a recording magnetic field for recording data on the recording medium; a waveguide that allows light to propagate therethrough; a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; an internal mirror; and a substrate having a top surface.

In the heat-assisted magnetic recording head of the present invention, the magnetic pole, the waveguide, the near-field light generating element, and the internal mirror are located above the top surface of the substrate. The internal mirror includes a reflecting film support body, and a reflecting film supported by the reflecting film support body. The internal mirror reflects light that comes from above the waveguide so that the reflected light travels through the waveguide toward the medium facing surface.

The reflecting film support body includes a first inclined surface and a second inclined surface, each of the first and second inclined surfaces having a front end and a rear end. The rear end of the first inclined surface is located farther from the medium facing surface and farther from the top surface of the substrate than is the front end of the first inclined surface. The front end of the second inclined surface is located farther from the medium facing surface and farther from the top surface of the substrate than is the front end of the first inclined surface. The rear end of the second inclined surface is located farther from the medium facing surface and farther from the top surface of the substrate than are the rear end of the first inclined surface and the front end of the second inclined surface. With respect to a virtual plane that includes the first inclined surface, the second inclined surface is offset in a direction perpendicular to the first inclined surface.

The reflecting film includes a first portion located on the first inclined surface, and a second portion located on the second inclined surface. The first portion includes a first reflecting surface having a front end and a rear end. The second portion includes a second reflecting surface having a front end and a rear end. The rear end of the first reflecting surface is located farther from the medium facing surface and farther from the top surface of the substrate than is the front end of the first reflecting surface. The front end of the second reflecting surface is located farther from the medium facing surface and farther from the top surface of the substrate than is the front end of the first reflecting surface. The rear end of the second reflecting surface is located farther from the medium facing surface and farther from the top surface of the substrate than are the rear end of the first reflecting surface and the front end of the second reflecting surface. With respect to a virtual plane that includes the first reflecting surface, the second reflecting surface is offset in a direction perpendicular to the first reflecting surface.

In the heat-assisted magnetic recording head of the present invention, each of the first and second reflecting surfaces may form an angle of 45° with respect to a direction perpendicular to the top surface of the substrate.

In the heat-assisted magnetic recording head of the present invention, the first and second inclined surfaces may be arranged so as not to overlap each other as seen in the direction perpendicular to the top surface of the substrate.

In the heat-assisted magnetic recording head of the present invention, the reflecting film may further include a coupling portion that couples the first portion to the second portion. The coupling portion may include a coupling surface that couples the first reflecting surface to the second reflecting surface. In this case, an angle formed by the coupling surface with respect to the direction perpendicular to the top surface of the substrate may be greater or smaller than an angle formed by each of the first and second reflecting surfaces with respect to the direction perpendicular to the top surface of the substrate.

In the heat-assisted magnetic recording head of the present invention, the first and second inclined surfaces may be arranged so as to overlap each other as viewed in the direction perpendicular to the top surface of the substrate.

In the heat-assisted magnetic recording head of the present invention, the near-field light generating element may have an outer surface, the outer surface including: a first end face that is located in the medium facing surface; a second end face that is farther from the medium facing surface; and a coupling part that couples the first end face to the second end face. The first end face may include the near-field light generating part. In this case, a length of the near-field light generating element in a direction perpendicular to the medium facing surface may be greater than a length of the first end face in the direction perpendicular to the top surface of the substrate, and the waveguide may have an outer surface including an opposed portion that is opposed to a part of the coupling part. In this case, the outer surface of the wave guide may include a front end face that is closer to the medium facing surface, a rear end face that is farther from the medium facing surface, and a top surface that is farther from the top surface of the substrate. The rear end face may be in contact with the first and second reflecting surfaces. The light that comes from above the waveguide may be reflected by the first and second reflecting surfaces after entering the waveguide from the top surface of the waveguide.

The heat-assisted magnetic recording head of the present invention may further include a laser diode that emits the light to be reflected by the internal mirror.

A heat-assisted magnetic recording head that is manufactured by a manufacturing method of the present invention includes: a medium facing surface that faces a recording medium; a magnetic pole that has an end face located in the medium facing surface, for producing a recording magnetic field for recording data on the recording medium; a waveguide that allows light to propagate therethrough; a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; an internal mirror; and a substrate having a top surface.

In the heat-assisted magnetic recording head manufactured by the manufacturing method of the present invention, the magnetic pole, the waveguide, the near-field light generating element, and the internal mirror are located above the top surface of the substrate. The internal mirror includes a reflecting film support body and a reflecting film, the reflecting film support body including at least one layer, the reflecting film being supported by the reflecting film support body. The internal mirror reflects light that comes from above the waveguide so that the reflected light travels through the waveguide toward the medium facing surface.

The manufacturing method for the heat-assisted magnetic recording head of the present invention includes the steps of forming: the magnetic pole; forming the internal mirror; forming the waveguide; and forming the near-field light generating element.

The step of forming the internal mirror includes the step of forming the reflecting film support body and the step of forming the reflecting film. The reflecting film support body includes a first inclined surface and a second inclined surface, each of the first and second inclined surfaces having a front end and a rear end. The rear end of the first inclined surface is located farther from the medium facing surface and farther from the top surface of the substrate than is the front end of the first inclined surface. The front end of the second inclined surface is located farther from the medium facing surface and farther from the top surface of the substrate than is the front end of the first inclined surface. The rear end of the second inclined surface is located farther from the medium facing surface and farther from the top surface of the substrate than are the rear end of the first inclined surface and the front end of the second inclined surface.

The step of forming the reflecting film support body includes the steps of forming an initial support body that is intended to undergo the formation of the first and second inclined surfaces therein later to thereby become the reflecting film support body; and etching the initial support body so that the first and second inclined surfaces are formed in the initial support body and the initial support body thereby becomes the reflecting film support body.

The step of etching the initial support body includes: the step of forming a first etching mask that covers a part of the initial support body except an area where the first inclined surface is to be formed later as viewed in the direction perpendicular to the top surface of the substrate; the first etching step of taper-etching the initial support body by reactive ion etching using the first etching mask; the step of removing the first etching mask; the step of forming a second etching mask that covers a part of the initial support body except an area where the first and second inclined surfaces are to be formed later as viewed in the direction perpendicular to the top surface of the substrate; the second etching step of taper-etching the initial support body by reactive ion etching using the second etching mask; and the step of removing the second etching mask.

After the second etching step, the first and second inclined surfaces are completed and the initial support body thereby becomes the reflecting film support body. The reflecting film includes a first portion located on the first inclined surface, and a second portion located on the second inclined surface. The first portion includes a first reflecting surface, and the second portion includes a second reflecting surface.

In the manufacturing method for the heat-assisted magnetic recording head of the present invention, with respect to a virtual plane that includes the first inclined surface, the second inclined surface may be offset in a direction perpendicular to the first inclined surface. In such a case, each of the first and second reflecting surfaces has a front end and a rear end. The rear end of the first reflecting surface is located farther from the medium facing surface and farther from the top surface of the substrate than is the front end of the first reflecting surface. The front end of the second reflecting surface is located farther from the medium facing surface and farther from the top surface of the substrate than is the front end of the first reflecting surface. The rear end of the second reflecting surface is located farther from the medium facing surface and farther from the top surface of the substrate than are the rear end of the first reflecting surface and the front end of the second reflecting surface. With respect to a virtual plane that includes the first reflecting surface, the second reflecting surface is offset in a direction perpendicular to the first reflecting surface.

In the manufacturing method for the heat-assisted magnetic recording head of the present invention, each of the first and second reflecting surfaces may form an angle of 45° with respect to the direction perpendicular to the top surface of the substrate.

In the manufacturing method for the heat-assisted magnetic recording head of the present invention, the initial support body may be made of alumina. The first and second etching steps may use an etching gas that contains $BCl_3$, $Cl_2$, and one of $N_2$ and $CF_4$.

In the manufacturing method for the heat-assisted magnetic recording head of the present invention, the first etching step may form an initial inclined surface in the initial support body, the initial inclined surface being inclined with respect to the direction perpendicular to the top surface of the substrate. The second etching step may form the first inclined surface and the second inclined surface, the first inclined surface being formed by etching a part of the initial support body under the initial inclined surface, the second inclined surface being formed by etching a part of the initial support body not etched in the first etching step. Here, each of the first and second etching masks may have a side surface that is closer to the medium facing surface. The side surface of the second etching mask may be located at a position farther from the medium facing surface by 0.8 to 1.2 times an etching depth of the second etching step, than a position where the side surface of the first etching mask is located.

In the manufacturing method for the heat-assisted magnetic recording head of the present invention, the reflecting film may further include a coupling portion that couples the first portion to the second portion. The coupling portion may include a coupling surface that couples the first reflecting surface to the second reflecting surface. In this case, an angle formed by the coupling surface with respect to the direction perpendicular to the top surface of the substrate may be greater or smaller than an angle formed by each of the first and second reflecting surfaces with respect to the direction perpendicular to the top surface of the substrate.

In the manufacturing method for the heat-assisted magnetic recording head of the present invention, the reflecting film support body may include a first layer having the first inclined surface and a second layer having the second inclined surface. Here, the step of forming the initial support body may include: the step of forming an initial first layer before the step of forming the first etching mask, the initial first layer being intended to undergo the formation of the first inclined surface therein later to thereby become the first layer; and the step of forming an initial second layer between the step of removing the first etching mask and the step of forming the second etching mask, the initial second layer being intended to undergo the formation of the second inclined surface therein later to thereby become the second layer. In such a case, the first etching mask is formed on the initial first layer, and the first etching step forms the first inclined surface by taper-etching the initial first layer. The second etching mask is formed on the initial second layer, and the second etching step forms the second inclined surface by taper-etching the initial second layer.

Where the components of the heat-assisted magnetic recording head excluding the substrate are concerned in the present application, a surface closer to the top surface of the substrate will be defined as "bottom surface," and a surface farther from the top surface of the substrate will be defined as "top surface."

The internal mirror of the heat-assisted magnetic recording head of the present invention includes the reflecting film support body and the reflecting film. The reflecting film support body includes the first and second inclined surfaces. With respect to a virtual plane that includes the first inclined surface, the second inclined surface is offset in a direction perpendicular to the first inclined surface. The reflecting film includes the first portion located on the first inclined surface and the second portion located on the second inclined surface. The first portion includes the first reflecting surface, and the second portion includes the second reflecting surface. With respect to a virtual plane that includes the first reflecting surface, the second reflecting surface is offset in a direction perpendicular to the first reflecting surface. The first and second inclined surfaces of the reflecting film support body of the present invention can be formed through a plurality of steps including two taper-etching operations, for example. The first and second inclined surfaces can be formed with higher precision, compared with a case of forming a single, plane inclined surface of large dimension. Consequently, according to the present invention, the first and second reflecting surfaces can also be formed with high precision. According to the present invention, it is therefore possible to prevent a drop in use efficiency of the light due to the internal mirror.

In the manufacturing method for the heat-assisted magnetic recording head of the present invention, the step of forming the reflecting film support body includes the step of forming the initial support body and the step of etching the initial support body. The step of etching the initial support body includes the first and second etching steps of taper-etching the initial support body. The first and second inclined surfaces are completed after the second etching step. According to the manufacturing method of the present invention, the first and second inclined surfaces can be formed with higher precision, compared with a case of forming a single, plane inclined surface of large dimension. Consequently, according to the present invention, the first and second reflecting surfaces can also be formed with high precision. According to the present invention, it is therefore possible to prevent a drop in use efficiency of the light due to the internal mirror.

In the heat-assisted magnetic recording head or the manufacturing method for the same of the present invention, the reflecting film has a coupling portion, and the angle formed by the coupling surface of the coupling portion with respect to the direction perpendicular to the top surface of the substrate may be smaller than the angle formed by each of the first and second reflecting surfaces with respect to the direction perpendicular to the top surface of the substrate. In such a case, it is possible to prevent part of the light incident on the internal mirror from returning to the light source.

Other and further objects, features and advantages of the present invention will appear more fully from the following description.

DETAILED DESCRIPTION OF THE PREFERRED EMBODIMENTS

First Embodiment

Figure 4:
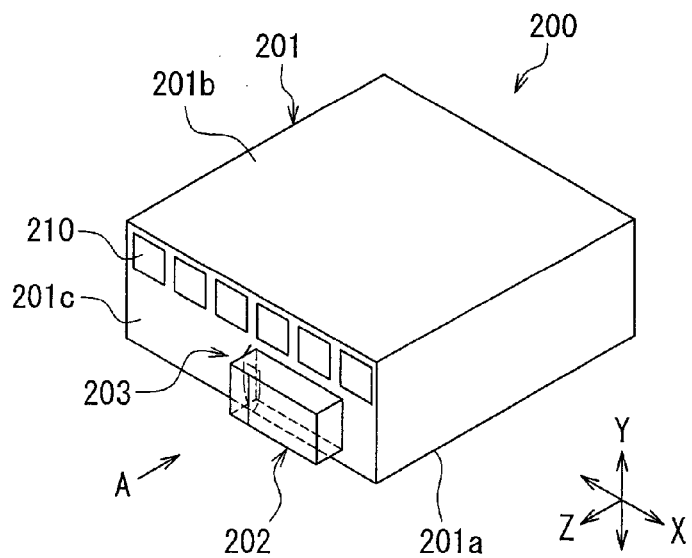
FIG. 4 is a perspective view of the heat-assisted magnetic recording head according to the first embodiment of the invention.
Figure 5:
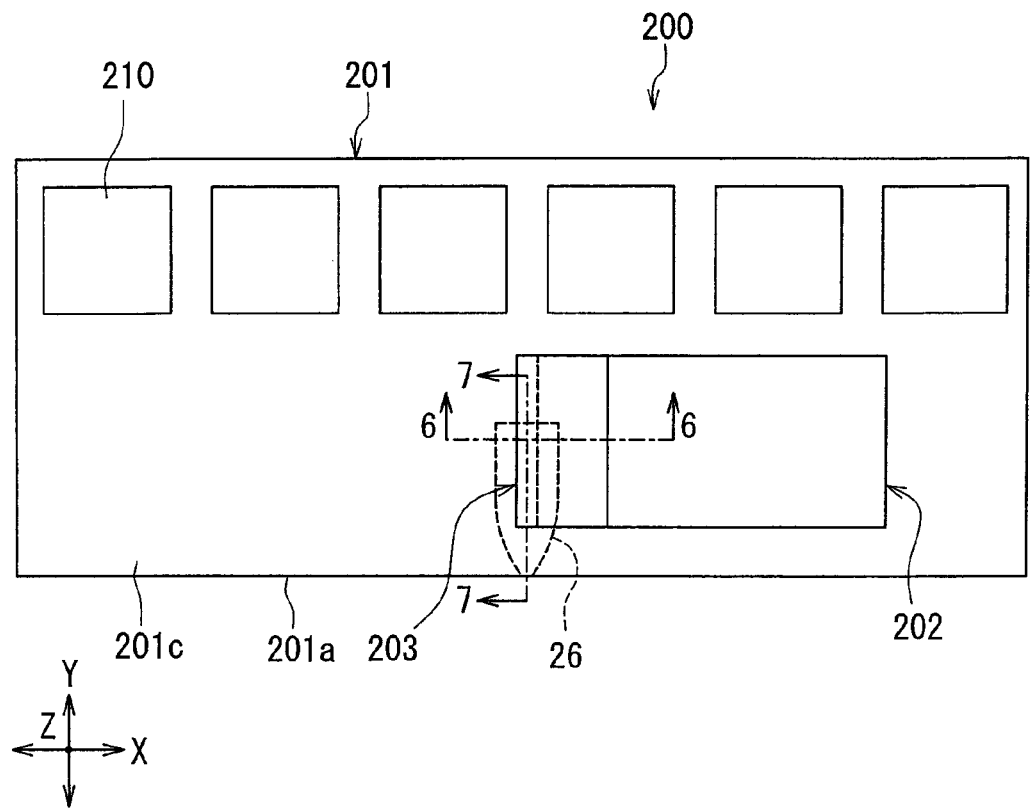
FIG. 5 is a plan view showing the heat-assisted magnetic recording head as viewed from the direction A of FIG. 4.

Preferred embodiments of the present invention will now be described in detail with reference to the drawings. Reference is first made to FIG. 4 and FIG. 5 to describe a heat-assisted magnetic recording head and a magnetic disk drive according to a first embodiment of the invention. FIG. 4 is a perspective view of the heat-assisted magnetic recording head according to the present embodiment. FIG. 5 is a plan view of the heat-assisted magnetic recording head as viewed from the direction A of FIG. 4.

The magnetic disk drive of the present embodiment incorporates the heat-assisted magnetic recording head 200 according to the present embodiment. The heat-assisted magnetic recording head 200 is supported by a not-shown suspension and is disposed to face a circular-plate-shaped recording medium (magnetic disk) that is driven to rotate. In FIG. 4 and FIG. 5, the X direction is a direction across the tracks of the recording medium, the Y direction is a direction perpendicular to the surface of the recording medium, and the Z direction is the direction of travel of the recording medium as viewed from the heat-assisted magnetic recording head 200. The X direction, the Y direction and the Z direction are orthogonal to one another.

The heat-assisted magnetic recording head 200 includes a slider 201, an edge-emitting laser diode 202 fixed to the slider 201, and an external mirror 203 provided outside the slider 201. The slider 201 is nearly hexahedron-shaped, and has a medium facing surface 201a that faces the recording medium, a rear surface 201b opposite to the medium facing surface 201a, and four surfaces that couple the medium facing surface 201a to the rear surface 201b. The medium facing surface 201a of the slider 201 also functions as the medium facing surface of the heat-assisted magnetic recording head 200. One of the four surfaces that couple the medium facing surface 201a to the rear surface 201b is a top surface 201c. The laser diode 202 is fixed to the top surface 201c. The slider 201 has a plurality of terminals 210 provided on the top surface 201c. In the present embodiment, the external mirror 203 is fixed to the laser diode 202.

When the recording medium rotates and travels in the Z direction, an airflow passing between the recording medium and the slider 201 generates a lift on the upper side in the Y direction of FIG. 4, and the lift is exerted on the slider 201. The lift causes the slider 201 to slightly fly over the surface of the recording medium.

Figure 1:
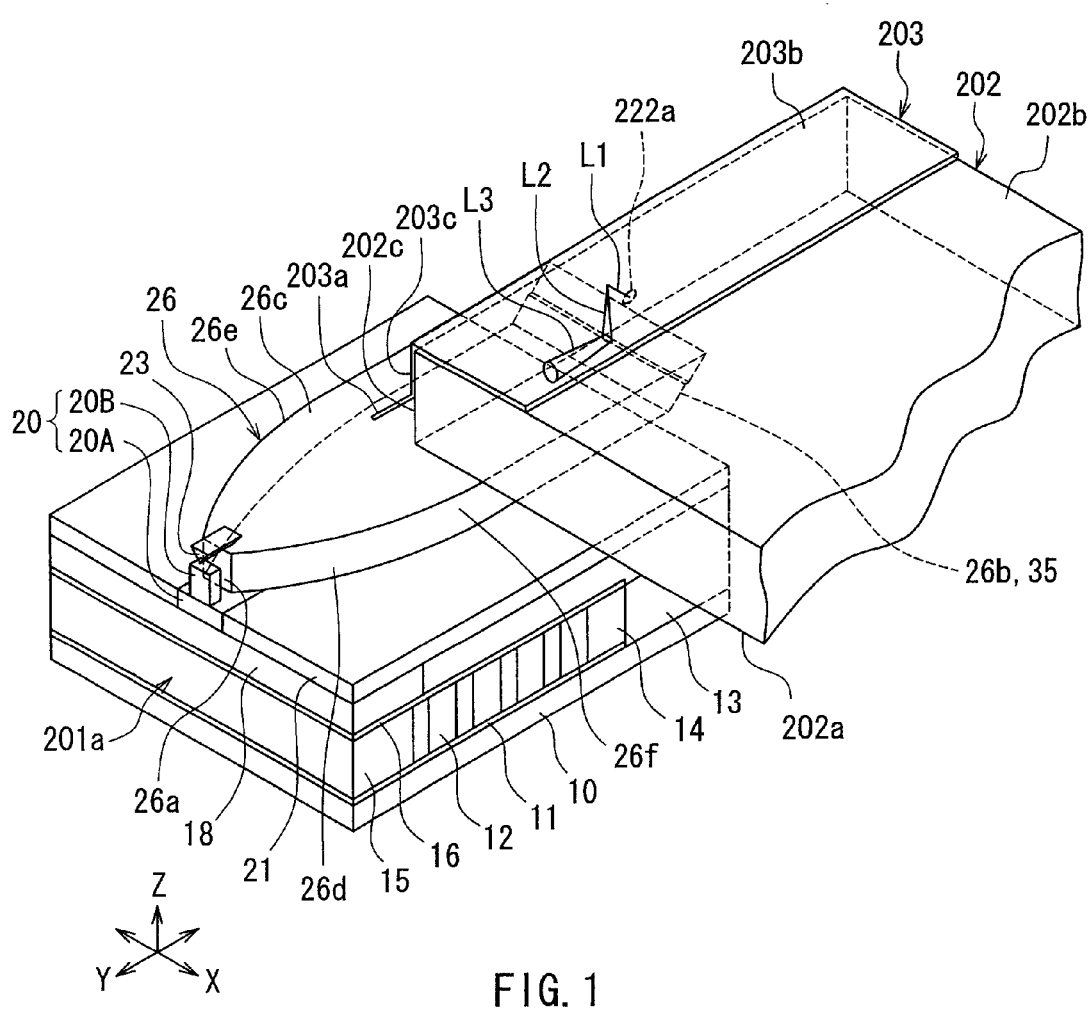
FIG. 1 is a perspective view showing the main part of a heat-assisted magnetic recording head according to a first embodiment of the invention.
Figure 7:
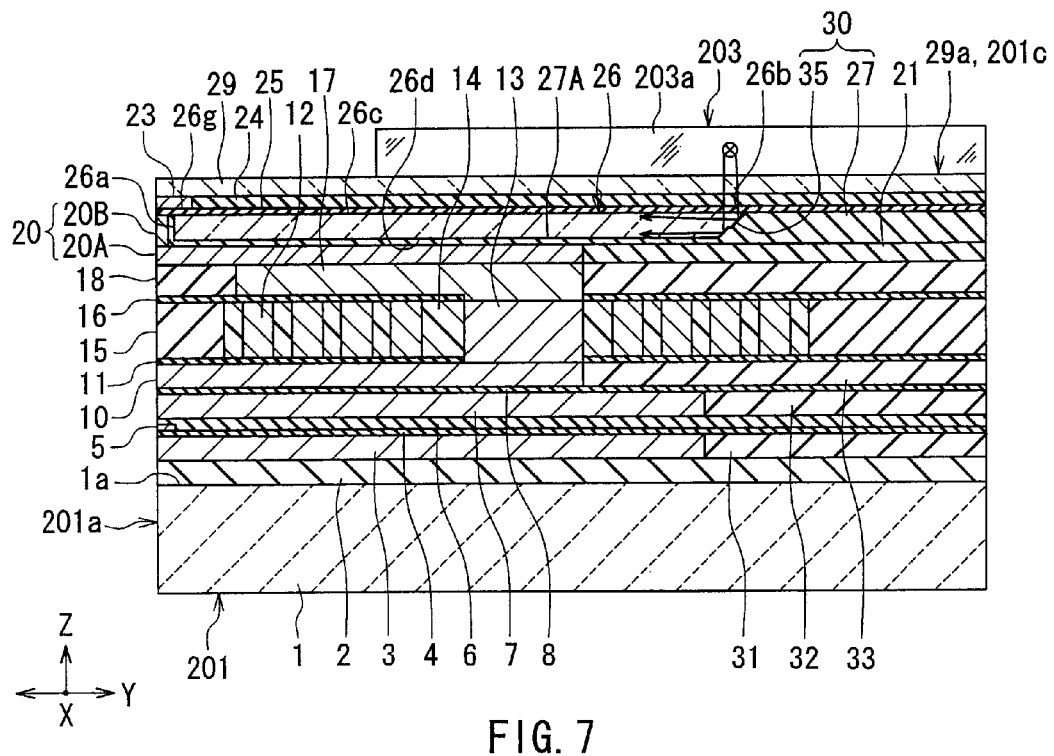
FIG. 7 is a cross-sectional view showing the configuration of a slider of the first embodiment of the invention.
Figure 8:
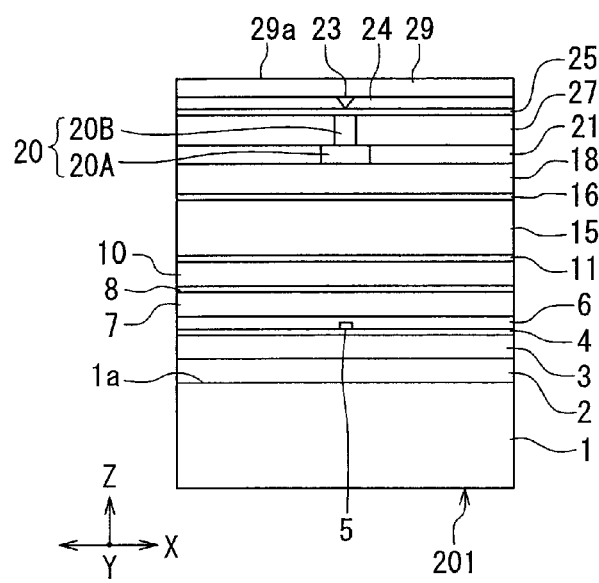
FIG. 8 is a front view showing the medium facing surface of the slider of the first embodiment of the invention.
Figure 9:
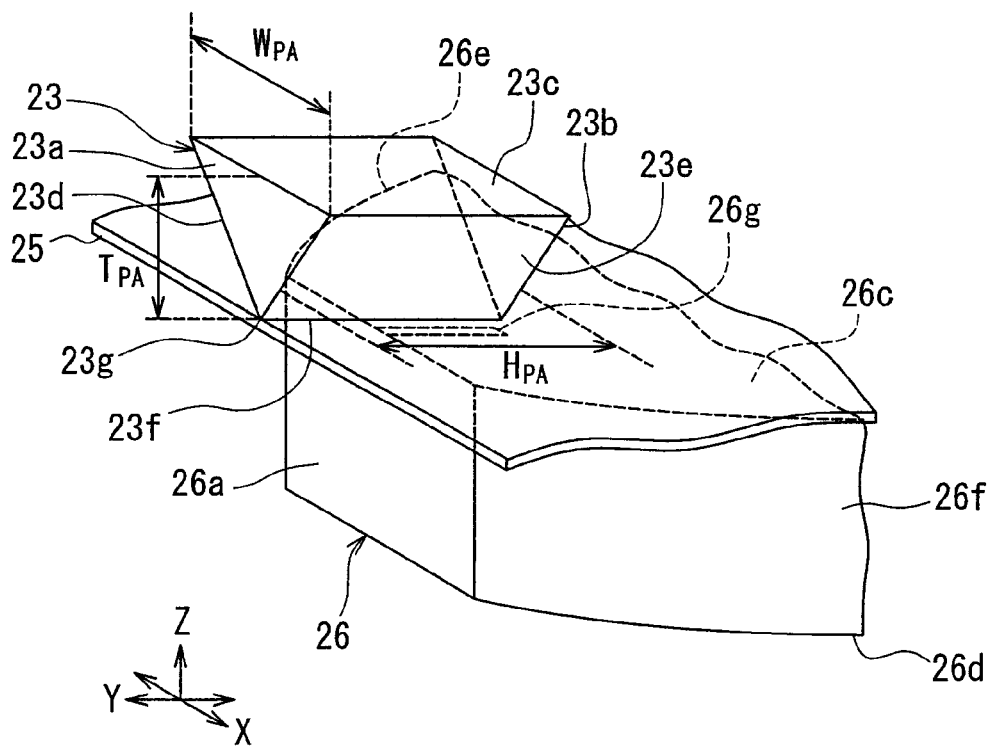
FIG. 9 is a perspective view showing a near-field light generating element and its vicinity in the heat-assisted magnetic recording head 15 according to the first embodiment of the invention.
Figure 10:
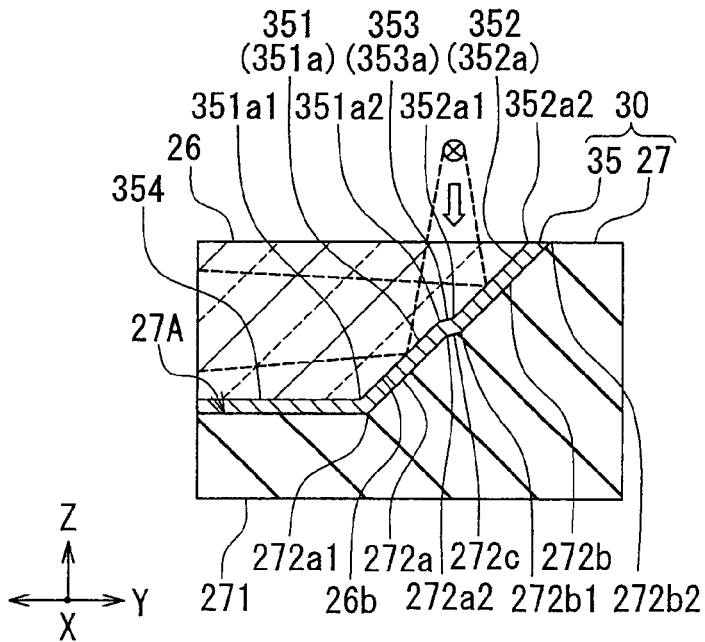
FIG. 10 is a cross-sectional view showing the internal mirror of FIG. 7 and its vicinity.

Reference is now made to FIG. 1 and FIG. 7 to FIG. 10 to describe the configuration of the slider 201 in detail. FIG. 1 is a perspective view showing the main part of the heat-assisted magnetic recording head 200 according to the present embodiment. FIG. 7 is a cross-sectional view showing the configuration of the slider 201. FIG. 7 shows a cross section taken along line 7-7 of FIG. 5. FIG. 8 is a front view showing the medium facing surface 201a of the slider 201. FIG. 9 is a perspective view showing a near-field light generating element and its vicinity in the heat-assisted magnetic recording head 200. FIG. 10 is a cross-sectional view showing an internal mirror and its vicinity in the heat-assisted magnetic recording head 200. The X, Y and Z directions shown in FIG. 4 are also shown in FIG. 1 and FIG. 7 to FIG. 10. In FIG. 7 and FIG. 10, the X direction is orthogonal to the Y and Z directions. In FIG. 8, the Y direction is orthogonal to the X and Z directions.

As shown in FIG. 7 and FIG. 8, the slider 201 includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 31 made of an insulating material and disposed around the bottom shield layer 3 on the insulating layer 2.

The insulating layers 2 and 31 are made of alumina (Al₂O₃), for example. The bottom shield layer 3 and the insulating layer 31 are flattened at the top.

The slider 201 further includes: a bottom shield gap film 4 which is an insulating film disposed over the top surfaces of the bottom shield layer 3 and the insulating layer 31; a magnetoresistive (MR) element 5 as a reproducing element disposed on the bottom shield gap film 4; a top shield gap film 6 which is an insulating film disposed on the MR element 5; a top shield layer 7 made of a magnetic material and disposed on the top shield gap film 6; and an insulating layer 32 made of an insulating material and disposed around the top shield layer 7 on the top shield gap film 6. The insulating layer 32 is made of alumina, for example. The top shield layer 7 and the insulating layer 32 are flattened at the top.

An end of the MR element 5 is located in the medium facing surface 201a. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. The parts from the bottom shield layer 3 to the top shield layer 7 constitute a reproducing head.

The slider 201 further includes: a nonmagnetic layer 8 made of a nonmagnetic material and disposed over the top surfaces of the top shield layer 7 and the insulating layer 32; a return magnetic pole layer 10 made of a magnetic material and disposed on the nonmagnetic layer 8; and an insulating layer 33 made of an insulating material and disposed around the return magnetic pole layer 10 on the nonmagnetic layer 8. The nonmagnetic layer 8 and the insulating layer 33 are made of alumina, for example. The return magnetic pole layer 10 and the insulating layer 33 are flattened at the top.

The slider 201 further includes: an insulating layer 11 disposed on part of the top surfaces of the return magnetic pole layer 10 and the insulating layer 33; a coil 12 disposed on the insulating layer 11; and a coupling layer 13 disposed on the return magnetic pole layer 10. The return magnetic pole layer 10 and the coupling layer 13 are each made of a magnetic material. The material of the return magnetic pole layer 10 and the coupling layer 13 may be CoFeN, CoNiFe, NiFe or CoFe, for example. The insulating layer 11 is made of alumina, for example. The coil 12 produces a magnetic field corresponding to data to be recorded on the recording medium. The coil 12 is planar spiral-shaped and wound around the coupling layer 13. The coil 12 is made of a conductive material such as copper.

The slider 201 further includes: an insulating layer 14 made of an insulating material and disposed around the coil 12 and in the space between every adjacent turns of the coil 12; an insulating layer 15 disposed around the insulating layer 14 and the coupling layer 13 on the insulating layer 11; and an insulating layer 16 disposed on the coil 12 and the insulating layers 14 and 15. The coil 12, the coupling layer 13 and the insulating layers 14 and 15 are flattened at the top. The insulating layer 14 is made of photoresist, for example. The insulating layers 15 and 16 are made of alumina, for example.

The slider 201 further includes: a bottom yoke layer 17 made of a magnetic material and disposed over the coupling layer 13 and the insulating layer 16; and a nonmagnetic layer 18 made of a nonmagnetic material and disposed around the bottom yoke layer 17 on the insulating layer 16. The bottom yoke layer 17 may be made of CoFeN, CoNiFe, NiFe, or CoFe, for example. The nonmagnetic layer 18 is made of alumina, for example. The bottom yoke layer 17 has an end face that is closer to the medium facing surface 201a, and this end face is located at a distance from the medium facing surface 201a. The bottom yoke layer 17 and the nonmagnetic layer 18 are flattened at the top.

The slider 201 further includes a magnetic pole 20. The magnetic pole 20 includes a first layer 20A and a second layer 20B. The first layer 20A lies over the bottom yoke layer 17 and the nonmagnetic layer 18. The first layer 20A has an end face located in the medium facing surface 201a. This end face is rectangular in shape, for example.

The second layer 20B lies on a part of the first layer 20A near the medium facing surface 201a. The second layer 20B has a front end face located in the medium facing surface 201a, and a rear end face opposite to the front end face. The front end face of the second layer 20B is rectangular in shape, for example.

The magnetic pole 20 passes a magnetic flux corresponding to the magnetic field produced by the coil 12, and produces a recording magnetic field for recording data on the recording medium by means of a perpendicular magnetic recording system. The position of the end of a bit pattern to be recorded on the recording medium depends on the position of the top edge, i.e., the edge farther from the top surface 1a of the substrate 1, of the front end face of the second layer 20B. The width of the front end face of the second layer 20B taken at the top edge defines the track width.

The width of the end face of the first layer 20A located in the medium facing surface 201a may be equal to or greater than the width of the front end face of the second layer 20B.

The first layer 20A and the second layer 20B are each made of a magnetic metal material. The material of each of the first layer 20A and the second layer 20B may be NiFe, CoNiFe, or CoFe, for example. The slider 201 further includes a nonmagnetic layer 21 made of a nonmagnetic material and disposed around the first layer 20A on the nonmagnetic layer 18. The nonmagnetic layer 21 is made of alumina, for example. The first layer 20A and the nonmagnetic layer 21 are flattened at the top. The slider 201 further includes an internal mirror 30 disposed over the top surfaces of the first layer 20A and the nonmagnetic layer 21, and a waveguide 26. The internal mirror 30 includes a reflecting film support body 27, and a reflecting film 35 supported by the reflecting film support body 27. The reflecting film support body 27 has a groove 27A that opens in the top surface of the support body 27. The waveguide 26 is accommodated in the groove 27A. The reflecting film support body 27 also functions as a clad layer for the waveguide 26.

As shown in FIG. 10, the groove 27A of the reflecting film support body 27 has a bottom 271, a first inclined surface 272a, a second inclined surface 272b, and a coupling surface 272c that couples the inclined surfaces 272a and 272b to each other. Each of the inclined surfaces 272a and 272b and the coupling surface 272c is a plane surface. The inclined surface 272a has a front end 272a1 that is closer to the medium facing surface 201a, and a rear end 272a2 that is farther from the medium facing surface 201a. The inclined surface 272b has a front end 272b1 that is closer to the medium facing surface 201a, and a rear end 272b2 that is farther from the medium facing surface 201a. The rear end 272a2 of the inclined surface 272a is located farther from the medium facing surface 201a and farther from the top surface 1a of the substrate 1 than is the front end 272a1 of the inclined surface 272a. The front end 272b1 of the inclined surface 272b is located farther from the medium facing surface 201a and farther from the top surface 1a of the substrate 1 than is the front end 272a1 of the inclined surface 272a. The rear end 272b2 of the inclined surface 272b is located farther from the medium facing surface 201a and farther from the top surface 1a of the substrate 1 than are the rear end 272a2 of the inclined surface 272a and the front end 272b1 of the inclined surface 272b.

The inclined surfaces 272a and 272b are arranged so as not to overlap each other as viewed in a direction perpendicular to the top surface 1a of the substrate 1. The inclined surface 272a is connected to the bottom 271. With respect to a virtual plane that includes the inclined surface 272a, the inclined surface 272b is offset in a direction perpendicular to the inclined surface 272a. Each of the inclined surfaces 272a and 272b forms an angle of, for example, 45° with respect to the direction perpendicular to the top surface 1a of the substrate 1. With respect to the direction perpendicular to the top surface 1a of the substrate 1, the coupling surface 272c forms an angle greater than that formed by each of the inclined surfaces 272a and 272b.

The reflecting film 35 is a film of metal such as Al, Ag, or Au, with a thickness of 50 to 200 nm or so. As shown in FIG. 10, the reflecting film 35 includes: a first portion 351 located on the first inclined surface 272a; a second portion 352 located on the second inclined surface 272b; a coupling portion 353 located on the coupling surface 272c and coupling the first portion 351 to the second portion 352; and a portion 354 located on the bottom 271 and coupled to the first portion 351. It should be noted that the reflecting film 35 need not include the portion 354.

The first portion 351 includes a first reflecting surface 351a, which is the surface opposite to that in contact with the inclined surface 272a. The second portion 352 includes a second reflecting surface 352a, which is the surface opposite to that in contact with the inclined surface 272b. The coupling portion 353 includes a coupling surface 353a that couples the first reflecting surface 351a to the second reflecting surface 352a. Each of the reflecting surfaces 351a and 352a and the coupling surface 353a is a plane surface. The first reflecting surface 351a has a front end 351a1 that is closer to the medium facing surface 201a, and a rear end 351a2 that is farther from the medium facing surface 201a. The second reflecting surface 352a has a front end 352a1 that is closer to the medium facing surface 201a, and a rear end 352a2 that is farther from the medium facing surface 201a. The rear end 351a2 of the first reflecting surface 351a is located farther from the medium facing surface 201a and farther from the top surface 1a of the substrate 1 than is the front end 351a1 of the first reflecting surface 351a. The front end 352a1 of the second reflecting surface 352a is located farther from the medium facing surface 201a and farther from the top surface 1a of the substrate 1 than is the front end 351a1 of the first reflecting surface 351a. The rear end 352a2 of the second reflecting surface 352a is located farther from the medium facing surface 201a and farther from the top surface 1a of the substrate 1 than are the rear end 351a2 of the first reflecting surface 351a and the front end 352a1 of the second reflecting surface 352a.

With respect to a virtual plane that includes the first reflecting surface 351a, the second reflecting surface 352a is offset in a direction perpendicular to the first reflecting surface 351a. Each of the reflecting surfaces 351a and 352a forms an angle of, for example, 45° with respect to the direction perpendicular to the top surface 1a of the substrate 1. With respect to the direction perpendicular to the top surface 1a of the substrate 1, the coupling surface 353a forms an angle greater than that formed by each of the reflecting surfaces 351a and 352a. The reflecting surfaces 351a and 352a reflect light that is emitted from a light source disposed above the waveguide 26 so that the reflected light travels through the waveguide 26 toward the medium facing surface 201a.

The waveguide 26 is made of a dielectric material that transmits laser light to be described later. The reflecting film support body 27 is made of a dielectric material that has a refractive index lower than that of the waveguide 26. For example, the waveguide 26 can be made of Ta2O5 which has a refractive index of approximately 2.1, and the reflecting film support body 27 can be made of alumina which has a refractive index of approximately 1.8. The second layer 20B, the waveguide 26, and the reflecting film support body 27 are flattened at the top. The shape of the waveguide 26 will be described in detail later.

The slider 201 further includes an interposition layer 25 disposed over the top surfaces of the second layer 20B, the waveguide 26 and the reflecting film support body 27. The interposition layer 25 is made of a dielectric material that has a refractive index lower than that of the waveguide 26 and transmits the laser light. For example, the interposition layer 25 can beamed of alumina which has a refractive index of approximately 1.8. The interposition layer 25 has a thickness within the range of 30 to 70 nm, for example.

The slider 201 further includes: a near-field light generating element 23 disposed on the interposition layer 25; a clad layer 24 disposed around the near-field light generating element 23 on the interposition layer 25; and a clad layer 29 having a top surface 29a and disposed over the near-field light generating element 23 and the clad layer 24. The near-field light generating element 23 and the clad layer 24 are flattened at the top. The near-field light generating element 23 is made of metal. Specifically, the near-field light generating element 23 is made of one of Au, Ag, Al, Cu, Pd, Pt, Rh and Ir, or of an alloy composed of two or more of these elements. The clad layers 24 and 29 are each made of a dielectric material that has a refractive index lower than that of the waveguide 26 and transmits the laser light. For example, the clad layers 24 and 29 can be made of alumina which has a refractive index of approximately 1.8. The clad layer 29 has a thickness within the range of 0.1 to 0.5 [tm, for example. The top surface 29a of the clad layer 29 constitutes the top surface 201c of the slider 201. The substrate 1 has the top surface 1a facing toward the magnetic pole 20, the near-field light generating element 23 and the waveguide 26. The top surface 201c of the slider 201 lies at an end above the top surface 1a of the substrate 1.

As shown in FIG. 9, the near-field light generating element 23 has a near-field light generating part 23g located in the medium facing surface 201a. The near-field light generating element 23 is in the shape of a triangular prism, having an outer surface described below. The outer surface of the near-field light generating element 23 includes: a first end face 23a that is located in the medium facing surface 201a; a second end face 23b that is farther from the medium facing surface 201a; and a coupling part that couples the first end face 23a to the second end face 23b. The coupling part includes: a top surface 23c that is farther from the top surface 1a of the substrate 1; two side surfaces 23d and 23e that decrease in distance from each other with decreasing distance to the top surface 1a of the substrate 1; and an edge part 23f that connects the two side surfaces 23d and 23e to each other. The first end face 23a is shaped like an isosceles triangle with the vertex downward. The first end face 23a includes the near-field light generating part 23g. Specifically, the near-field light generating part 23g refers to the end of the edge part 23f and its vicinity in the end face 23a.

As shown in FIG. 9, the length of the near-field light generating element 23 in the direction perpendicular to the medium facing surface 201a will be denoted by the symbol HPA; the width of the first end face 23a at its top edge will be denoted by the symbol WPA; and the length of the first end face 23a in the direction perpendicular to the top surface 1a of the substrate 1 will be denoted by the symbol TPA. The length HPA of the near-field light generating element 23 in the direction perpendicular to the medium facing surface 201a is greater than the length TPA of the first end face 23a in the direction perpendicular to the top surface 1a of the substrate 1. Both of WPA and TPA are smaller than or equal to the wavelength of light that propagates through the waveguide 26. WPA falls within the range of 50 to 150 nm, for example. TPA falls within the range of 50 to 150 nm, for example. HPA falls within the range of 0.25 to 2.5 pm, for example.

A detailed description will now be given of the waveguide 26 with reference to FIG. 1, FIG. 5, FIG. 7, FIG. 9 and FIG. 10. As shown in FIG. 1, FIG. 5 and FIG. 7, the waveguide 26 extends in the direction perpendicular to the medium facing surface 201a (the Y direction). The waveguide 26 has an outer surface. The outer surface includes: a front end face 26a that is closer to the medium facing surface 201a; a rear end face 26b that is farther from the medium facing surface 201a; a top surface 26c that is farther from the top surface 1a of the substrate 1; a bottom surface 26d that is closer to the top surface 1a of the substrate 1; and two side surfaces 26e and 26f that are located on opposite sides in the track width direction. The front end face 26a is opposed to the rear end face of the second layer 20B with a part of the reflecting film support body 27 interposed therebetween. As shown in FIG. 9, the outer surface of the waveguide 26 includes an opposed portion 26g that is opposed to a part of the coupling part of the outer surface of the near-field light generating element 23. In the present embodiment, in particular, the opposed portion 26g is a portion of the top surface 26c of the waveguide 26 that is opposed to a part of the edge part 23f of the near-field light generating element 23 and its vicinity with the interposition layer 25 interposed therebetween. The previously-mentioned configuration that the length HPA of the near-field light generating element 23 in the direction perpendicular to the medium facing surface 201a is greater than the length TPA of the first end face 23a in the direction perpendicular to the top surface 1a of the substrate 1 is necessary in order that the opposed portion 26g, which is a part of the top surface 26c of the waveguide 26, is opposed to a part of the edge part 23f of the near-field light generating element 23 and its vicinity with the interposition layer 25 interposed therebetween.

As shown in FIG. 10, the rear end face 26b is in contact with the reflecting surfaces 351a and 352a and the coupling surface 353a. The distance between the medium facing surface 201a and an arbitrary point on the rear end face 26b increases with increasing distance between the arbitrary point and the top surface 1a of the substrate 1.

Figure 3:
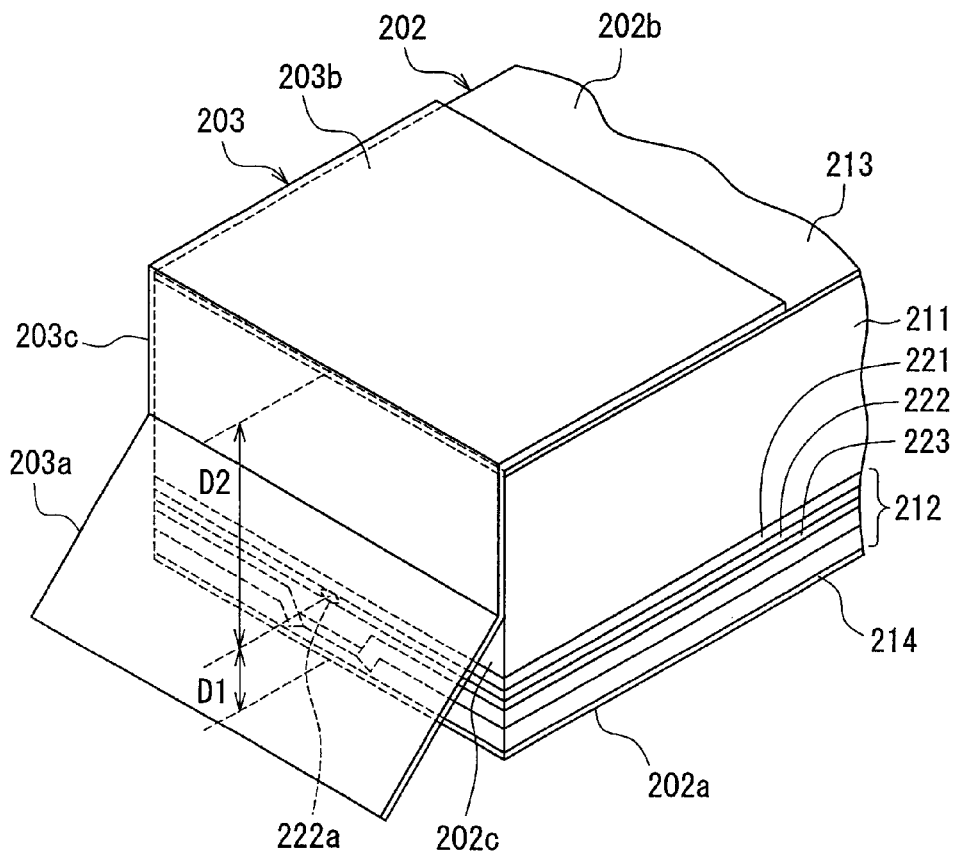
FIG. 3 is a perspective view showing the laser diode and the external mirror of FIG. 1.

As shown in FIG. 7 and FIG. 10, the internal mirror 30 reflects light that is emitted from the light source disposed above the waveguide 26 with its reflecting surfaces 351a and 352a, so that the reflected light travels through the waveguide 26 toward the medium facing surface 201a. More specifically, the internal mirror 30 is configured to reflect the light that comes from above the waveguide 26, enters the waveguide 26 from the top surface 26c of the waveguide 26 and reaches the rear end face 26b and the reflecting surfaces 351a and 352a, so that the reflected light travels toward the front end face 26a. Reference is now made to FIG. 3 to describe the laser diode 202 and the external mirror 203. FIG. 3 is a perspective view showing the laser diode 202 and the external mirror 203. As shown in FIG. 3, the laser diode 202 includes: an n-substrate 211 having a top surface and a bottom surface; a laser structure part 212 disposed below the bottom surface of the n-substrate 211; an n-electrode 213 joined to the top surface of the n-substrate 211; and a p-electrode 214 joined to the laser structure part 212 such that the laser structure part 212 is sandwiched between the n-substrate 211 and the p-electrode 214. The laser structure part 212 includes at least an n-clad layer 221, an active layer 222 and a p-clad layer 223. The n-clad layer 221 is disposed between the n-substrate 211 and the active layer 222. The p-clad layer 223 is disposed between the p-electrode 214 and the active layer 222. The active layer 222 has a surface that faces the n-clad layer 221, and a surface that faces the p-clad layer 223.

The laser diode 202 is rectangular-solid-shaped and has a bottom surface 202a and a top surface 202b lying at opposite ends in a direction perpendicular to the plane of the active layer 222, and four surfaces that connect the bottom surface 202a and the top surface 202b to each other.

The bottom surface 202a and the top surface 202b are parallel to the plane of the active layer 222. The bottom surface 202a is formed by the surface of the p-electrode 214. The top surface 202b is formed by the surface of the n-electrode 213. One of the four surfaces that connect the bottom surface 202a and the top surface 202b to each other is a surface 202c. The surface 202c includes an emission part 222a for emitting laser light. The emission part 222a lies at an end of the active layer 222. Hereinafter, the surface 202c will be referred to as the emitting end face. The bottom surface 202a and the top surface 202b each have an area greater than that of the emitting end face 202c.

The laser diode 202 is fixed to the slider 201 such that the bottom surface 202a lying at an end in the direction perpendicular to the plane of the active layer 222 faces the top surface 201c of the slider 201. In the present embodiment, in particular, the bottom surface 202a of the laser diode 202 is joined to the top surface 201c of the slider 201. For example, an adhesive is used to join the bottom surface 202a of the laser diode 202 to the top surface 201c of the slider 201.

The slider 201 may include a conductor layer that is arranged to be exposed in the top surface 201c and connects the p-electrode 214 of the laser diode 202 to one of the terminals 210. Here, the p-electrode 214 may be electrically connected to the conductor layer by joining the bottom surface 2a of the laser diode 202 to the top surface 201c of the slider 201. In such a case, the bottom surface 202a of the laser diode 202 and the conductor layer are connected to each other by soldering, for example. The n-electrode 213 of the laser diode 202 is connected to another one of the terminals 210 with a bonding wire, for example.

Figure 6:
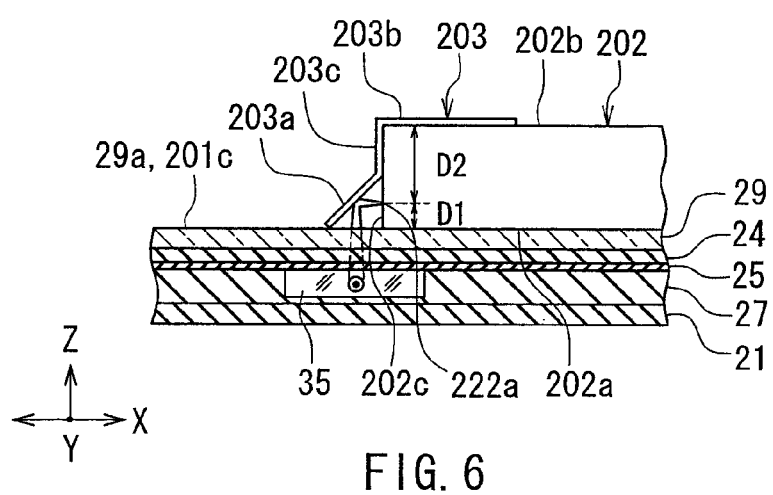
FIG. 6 is a cross-sectional view showing a part of the cross section of the heat-assisted magnetic recording head taken along line 6-6 of FIG. 5.

In the present embodiment, as shown in FIG. 3 and FIG. 6, the distance D1 between the bottom surface 202a and the emission part 222a of the laser diode 202 is smaller than the distance D2 between the top surface 2b and the emission part 222a of the laser diode 202.

The external mirror 203 includes a reflecting part 203a and to-be-fixed parts 203b and 203c each of which is shaped like a plate. The to-be-fixed parts 203b and 203c are coupled to each other to form an angle of 90° therebetween. The reflecting part 203a is coupled to an end of the to-be-fixed part 203c so as to form an angle of 135° with respect to the to-be-fixed part 203c. The to-be-fixed part 203b is coupled to the opposite end of the to-be-fixed part 203c. The to-be-fixed part 203b is fixed to the top surface 202a while the to-be-fixed part 203c is fixed to the emitting end face 202c, whereby the external mirror 203 is fixed to the laser diode 202. The reflecting part 203a is located in front of the emission part 222a. One of the surfaces of the reflecting part 203a that is closer to the emission part 222a constitutes a reflecting surface for reflecting the laser light emitted from the emission part 222a toward the waveguide 26 in the slider 201. The normal to the reflecting surface forms an angle of 45° with respect to the direction of travel of the laser light emitted from the emission part 222a.

The external mirror 203 can be formed by, for example, molding a body out of an insulating material such as resin or glass, and forming a metal film on at least a part of the body that is to make the reflecting surface by vapor deposition, sputtering, or the like.

The portion from the return magnetic pole layer 10 to the clad layer 29, and the laser diode 202 and the external mirror 203 constitute a recording 20 head.

Figure 2:
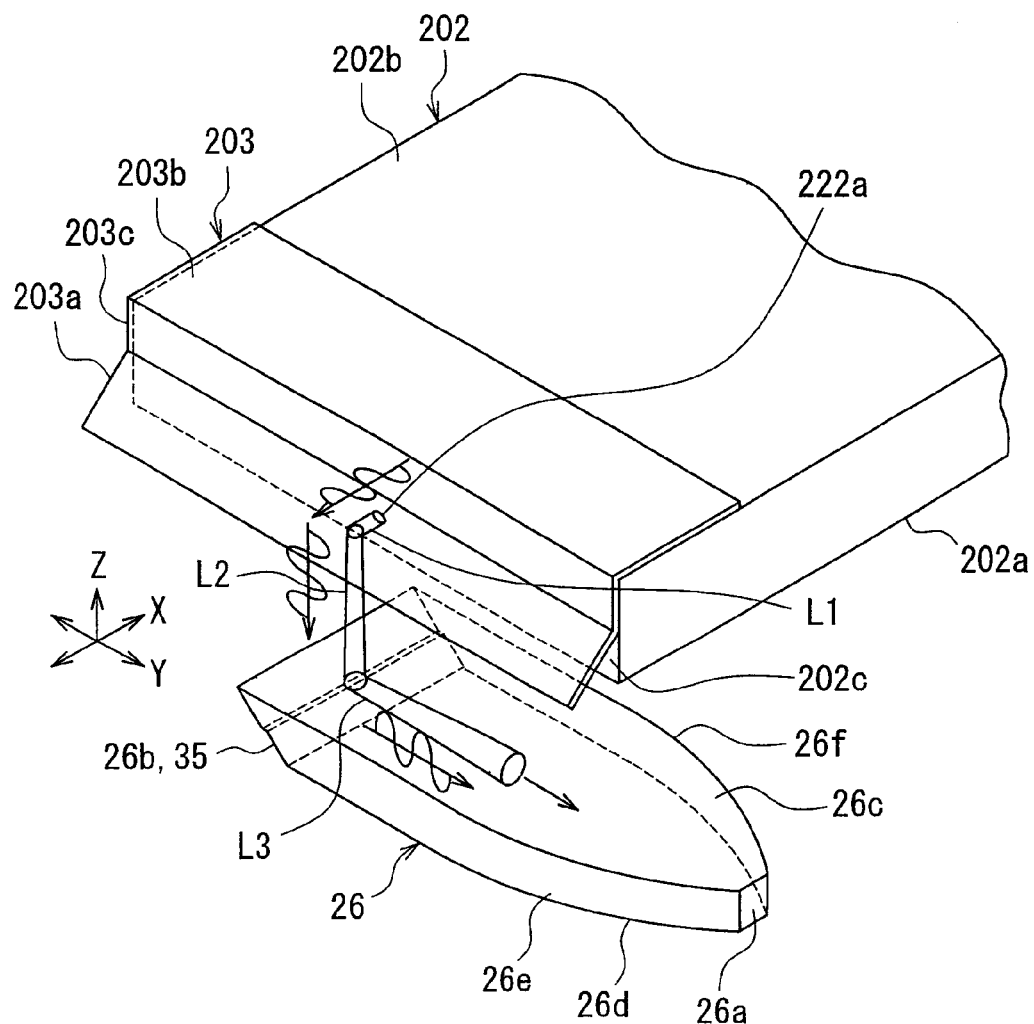
FIG. 2 is a perspective view showing the positional relationship between the laser diode, external mirror, internal mirror, and waveguide of FIG. 1, and the direction of polarization of laser light.

Reference is now made to FIG. 1, FIG. 2, FIG. 6 and FIG. 7 to describe the path of the laser light emitted from the emission part 222a of the laser diode 202. FIG. 2 is a perspective view showing the positional relationship between the laser diode 202, the external mirror 203, the internal mirror 30, and the waveguide 26 of FIG. 1, and the direction of polarization of the laser light. FIG. 6 is a cross-sectional view showing a part of the cross section of the heat-assisted magnetic recording head 200 taken along line 6-6 of FIG. 5. The X, Y and Z directions shown in FIG. 4 are also shown in FIG. 2 and FIG. 6. In FIG. 6, the Y direction is orthogonal to the X and Z directions.

The laser light emitted from the emission part 222a of the laser diode 202 is reflected by the reflecting surface of the reflecting part 203a of the external mirror 203, passes through the clad layer 29, the clad layer 24, and the interposition layer 25, and enters the waveguide 26 from the top surface 26c to reach the rear end face 26b and the reflecting surfaces 351a and 352a. The laser light is then reflected by the reflecting surfaces 351a and 352a of the reflecting film 35 of the internal mirror 30 so as to travel through the waveguide 26 toward the medium facing surface 201a (the front end face 26a).

As shown in FIG. 1 and FIG. 2, the laser light emitted from the emission part 222a will be designated by the reference symbol L1; the laser light reflected by the external mirror 203 will be designated by the reference symbol L2; and the laser light reflected by the internal mirror 30 will be designated by the reference symbol L3. In the present embodiment, the laser diode 202, the external mirror 203, the internal mirror 30 and the waveguide 26 are arranged so that the direction of travel of the laser light L1 emitted from the emission part 222a and the direction of travel of the laser light L3 reflected by the internal mirror 30 are orthogonal to each other as viewed from above the top surface 201c of the slider 201.

FIG. 1 and FIG. 2 show an example of the configuration of the waveguide 26. In this example, the two side surfaces 26e and 26f of the waveguide 26 are formed as a reflecting surface of parabolic shape in the vicinity of the front end face 26a as viewed from above. This reflecting surface has the function of collecting the light propagating through the wave guide 26 to the vicinity of the front end face 26a.

With reference to FIG. 2, the direction of polarization of the laser light in the present embodiment will be described. In the present embodiment, the laser diode 202 emits linearly polarized laser light whose electric field oscillates in a direction parallel to the plane of the active layer 222, i.e., laser light of TE mode, from the emission part 222a. The direction of oscillation of the electric field of the laser light emitted from the emission part 222a is parallel to the XY plane. The laser light emitted from the emission part 222a is reflected by the reflecting surface of the reflecting part 203a of the external mirror 203 and travels toward the wave guide 26. Here, the direction of oscillation of the electric field of this laser light is parallel to the YZ plane. This laser light passes through the clad layer 29, the clad layer 24, and the interposition layer 25, enters the waveguide 26 from the top surface 26c, and is reflected by the internal mirror 30. The direction of oscillation of the electric field of the laser light reflected by the internal mirror 30 is parallel to the YZ plane. The laser light reflected by the internal mirror 30 propagates through the waveguide 26 to reach the opposed portion 26g. The direction of oscillation of the electric field of this laser light is perpendicular to the opposed portion 26g. This makes it possible to produce surface plasmons of high intensity on the near-field light generating element 23.

As has been described, the heat-assisted magnetic recording head 200 according to the present embodiment includes the slider 201, the edge-emitting laser diode 202 fixed to the slider 201, and the external mirror 203 provided outside the slider 201. The slider 201 includes: the medium facing surface 201a that faces the recording medium; the reproducing head; and a portion of the recording head excluding the laser diode 202 and the external mirror 203 (hereinafter, referred to as an in-slider portion of the recording head). The reproducing head and the in-slider portion of the recording head are stacked on the substrate 1. Relative to the reproducing head, the in-slider portion of the recording head is located on the front side (trailing side) in the direction of travel of the recording medium (the Z direction).

The reproducing head includes: the MR element 5 as the reproducing element; the bottom shield layer 3 and the top shield layer 7 for shielding the MR element 5, the respective portions of the bottom shield layer 3 and the top shield layer 7 located near the medium facing surface 201a being opposed to each other with the MR element 5 therebetween; the bottom shield gap film 4 disposed between the MR element 5 and the bottom shield layer 3; and the top shield gap film 6 disposed between the MR element 5 and the top shield layer 7.

The in-slider portion of the recording head includes the return magnetic pole layer 10, the coil 12, the coupling layer 13, the bottom yoke layer 17, and the magnetic pole 20. The coil 12 produces a magnetic field corresponding to data to be recorded on the recording medium. The return magnetic pole layer 10, the coupling layer 13, the bottom yoke layer 17 and the magnetic pole 20 form a magnetic path for passing a magnetic flux corresponding to the magnetic field produced by the coil 12. The magnetic pole 20 includes the first layer 20A and the second layer 20B. The magnetic pole 20 allows the magnetic flux corresponding to the magnetic field produced by the coil 12 to pass, and produces a recording magnetic field for recording data on the recording medium by means of the perpendicular magnetic recording system. The position of the end of a bit pattern to be recorded on the recording medium depends on the position of the top edge, i.e., the edge farther from the top surface 1a of the substrate 1, of the front end face of the second layer 20B located in the medium facing surface 201a. The width of the front end face of the second layer 20B located in the medium facing surface 201a taken at the top edge defines the track width. The return magnetic pole layer 10, the coupling layer 13 and the bottom yoke layer 17 have the function of returning, to the magnetic pole 20, a magnetic flux that has been generated from the magnetic pole 20 and has magnetized the recording medium.

The in-slider portion of the recording head further includes the near-field light generating element 23, the interposition layer 25, the waveguide 26, the clad layers 24 and 29, and the internal mirror 30. The substrate 1 has the top surface 1a. The magnetic pole 20, the waveguide 26, the near-field light generating element 23, and the internal mirror 30 are located above the top surface 1a of the substrate 1. The waveguide 26, the near-field light generating element 23, and the internal mirror 30 are located farther from the top surface 1a of the substrate 1 than is the first layer 20A of the magnetic pole 20. The front end face 26a of the waveguide 26 is opposed to the rear end face of the second layer 20B. The rear end face 26b of the waveguide 26 is in contact with the reflecting surfaces 351a and 352a of the reflecting film 35 of the internal mirror 30. The near-field light generating element 23 is located farther from the top surface 1a of the substrate 1 than is the second layer 20B. The interposition layer 25, the near-field light generating element 23, and the clad layers 24 and 29 are located farther from the top surface 1a of the substrate 1 than is the waveguide 26. The clad layer 29 has the top surface 29a. The top surface 29a of the clad layer 29 constitutes the top surface 201c of the slider 201.

The outer surface of the near-field light generating element 23 includes: the first end face 23a that is located in the medium facing surface 201a; the second end face 23b that is farther from the medium facing surface 201a; and the coupling part that couples the first end face 23a to the second end face 23b. The coupling part includes: the top surface 23c that is farther from the top surface 1a of the substrate 1; the two side surfaces 23d and 23e that decrease in distance from each other with decreasing distance to the top surface 1a of the substrate 1; and the edge part 23f that connects the two side surfaces 23d and 23e to each other. The first end face 23a includes the near-field light generating part 23g. The length HPA of the near-field light generating element 23 in the direction perpendicular to the medium facing surface 201a (the Y direction) is greater than the length TPA of the first end face 23a in the direction perpendicular to the top surface 1a of the substrate 1. As will be detailed later, surface plasmons are excited on the near-field light generating element 23 based on the light propagating through the waveguide 26. The surface plasmons propagate to the near-field light generating part 23g, and the near-field light generating part 23g generates near-field light based on the surface plasmons.

The waveguide 26 is located closer to the top surface 1a of the substrate 1 than is the near-field light generating element 23. The outer surface of the waveguide 26 includes the opposed portion 26g that is opposed to a part of the edge part 23f of the near-field light generating element 23 with the interposition layer 25 interposed therebetween.

The reflecting film support body 27, the interposition layer 25, and the clad layers 24 and 29 are each made of a dielectric material having a refractive index lower than that of the waveguide 26. Consequently, the outer surface of the waveguide 26 excluding the portion in contact with the reflecting film 35 is covered with the dielectric material that is lower in refractive index than the waveguide 26.

The recording head further includes the edge-emitting laser diode 202 fixed to the slider 201, and the external mirror 203 fixed to the laser diode 202. The laser diode 202 includes: the active layer 222; the emitting end face 202c that lies at an end in the direction parallel to the plane of the active layer 222 and includes the emission part 222a for emitting laser light; and the bottom surface 202a that lies at an end in the direction perpendicular to the plane of the active layer 222. The laser diode 202 is arranged so that the bottom surface 202a faces the top surface 201c of the slider 201. The external mirror 203 reflects the laser light emitted from the emission part 222a toward the waveguide 26. The laser light reflected by the external mirror 203 passes through the clad layer 29, the clad layer 24, and the interposition layer 25, and enters the waveguide 26 from the top surface 26c to reach the rear end face 26b, where the laser light is reflected by the internal mirror 30 so as to travel through the waveguide 26 toward the medium facing surface 201a (the front end face 26a).

Now, the principle of generation of near-field light in the present embodiment and the principle of heat-assisted magnetic recording using the near-field light will be described in detail. As described above, the laser light emitted from the emission part 222a of the laser diode 202 is reflected by the external mirror 203, passes through the clad layer 29, the clad layer 24 and the interposition layer 25, enters the waveguide 26 from the top surface 26c, and reaches the rear end face 26b. The laser light is then reflected by the internal mirror 30 and travels through the waveguide 26 toward the medium facing surface 201a (the front end face 26a).

Propagating through the waveguide 26, the laser light reaches the vicinity of the opposed portion 26g. The laser light is then totally reflected at the interface between the opposed portion 26g and the interposition layer 25, and this generates evanescent light permeating into the interposition layer 25. As a result, the evanescent light and the collective oscillations of charges on a part of the coupling part (a part of the edge part 23f and its vicinity) of the outer surface of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the edge part 23f of the near-field light generating element 23 toward the near-field light generating part 23g. Consequently, the surface plasmons concentrate at the near-field light generating part 23g, and the near-field light generating part 23g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a recording magnetic field produced by the magnetic pole 20 for data recording.

Reference is now made to FIG. 11A to FIG. 20A and FIG. 11B to FIG. 20B to describe a manufacturing method for the heat-assisted magnetic recording head 200 according to the present embodiment. FIG. 11A to FIG. 20A each show a cross section of a stack of layers in the process of manufacturing the heat-assisted magnetic recording head 200, the cross section being perpendicular to the medium facing surface 201a and the top surface 1a of the substrate 1. In FIG. 11A to FIG. 20A, the symbol "ABS" indicates the position where the medium facing surface 201a is to be formed. FIG. 11B to FIG. 20B show cross sections at the position ABS of FIG. 11A to FIG. 20A, respectively.

Figure 11A:
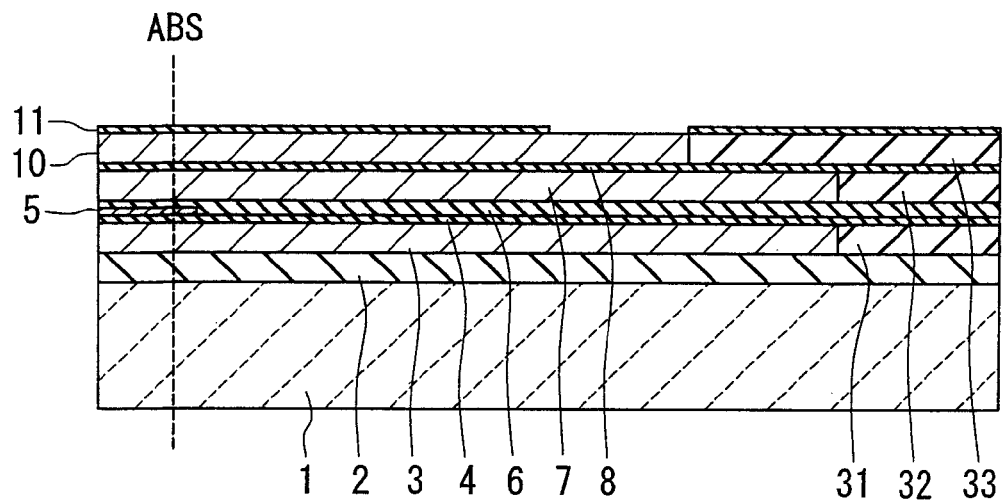
FIG. 11A and FIG. 11B are explanatory diagrams showing a step of a manufacturing method for the heat-assisted magnetic recording head according to the first embodiment of the invention.
Figure 11B:
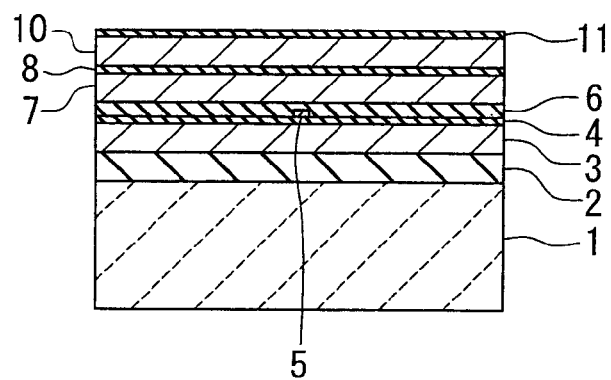

In the manufacturing method for the heat-assisted magnetic recording head 200 according to the present embodiment, first, the insulating layer 2 is formed on the substrate 1 as shown in FIG. 11A and FIG. 11B. Next, the bottom shield layer 3 is formed on the insulating layer 2. Next, the insulating layer 31 is formed to cover the bottom shield layer 3. The insulating layer 31 is then polished by, for example, chemical mechanical polishing (hereinafter referred to as CMP), until the bottom shield layer 3 is exposed. This flattens the bottom shield layer 3 and the insulating layer 31 at the top. Next, the bottom shield gap film 4 is formed over the bottom shield layer 3 and the insulating layer 31. Next, the MR element 5 and not-shown leads connected to the MR element 5 are formed on the bottom shield gap film 4. Next, the top shield gap film 6 is formed to cover the MR element 5 and the leads. Next, the top shield layer 7 is formed on the top shield gap film 6. Next, the insulating layer 32 is formed to cover the top shield layer 7. Next, the insulating layer 32 is polished by, for example, CMP, until the top shield layer 7 is exposed. This flattens the top shield layer 7 and the insulating layer 32 at the top. Next, the nonmagnetic layer 8 is formed over the top shield layer 7 and the insulating layer 32. Next, the return magnetic pole layer 10 is formed on the nonmagnetic layer 8. Next, the insulating layer 33 is formed to cover the return magnetic pole layer 10. The insulating layer 33 is then polished by, for example, CMP, until the return magnetic pole layer 10 is exposed. This flattens the return magnetic pole layer 10 and the insulating layer 33 at the top. Next, the insulating layer 11 is formed on part of the top surfaces of the return magnetic pole layer 10 and the insulating layer 33.

Figure 12A:
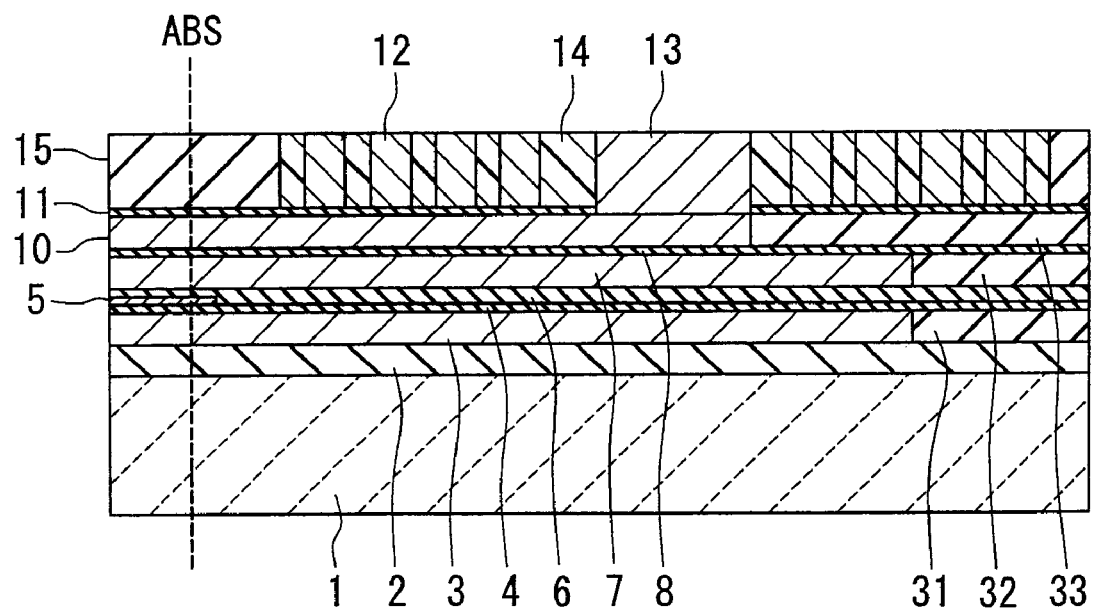
FIG. 12A and FIG. 12B are explanatory diagrams showing a step that follows the step of FIG. 11A and FIG. 11B.
Figure 12B:
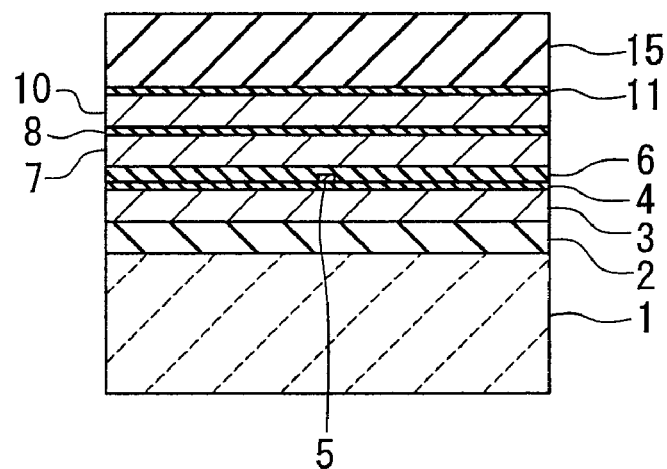

FIG. 12A and FIG. 12B show the next step. In this step, first, the coil 12 is formed on the insulating layer 11 by frame plating, for example. Next, the coupling layer 13 is formed on the return magnetic pole layer 10 by frame plating, for example. Alternatively, the coil 12 may be formed after forming the coupling layer 13. Next, the insulating layer 14 made of photoresist, for example, is selectively formed around the coil 12 and in the space between every adjacent turns of the coil 12. Next, the insulating layer 15 is formed over the entire top surface of the stack by sputtering, for example. The insulating layer 15 is then polished by, for example, CMP, until the coil 12 and the coupling layer 13 are exposed. This flattens the coil 12, the coupling layer 13 and the insulating layers 14 and 15 at the top.

Figure 13A:
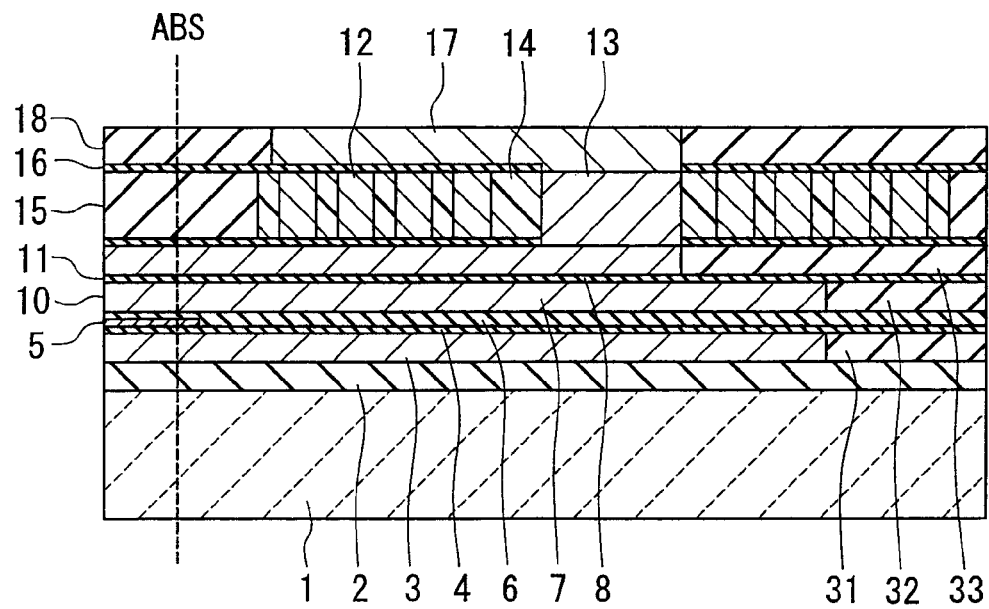
FIG. 13A and FIG. 13B are explanatory diagrams showing a step that follows the step of FIG. 12A and FIG. 12B.
Figure 13B:
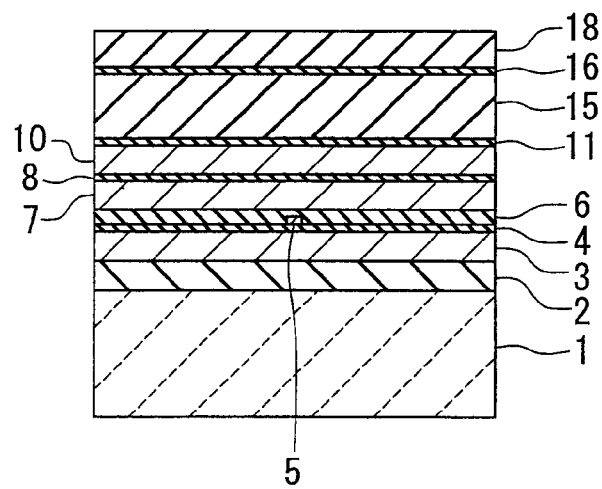

FIG. 13A and FIG. 13B show the next step. In this step, first, the insulating layer 16 is formed. Next, the bottom yoke layer 17 is formed over the coupling layer 13 and the insulating layer 16 by frame plating, for example. Next, the nonmagnetic layer 18 is formed over the entire top surface of the stack. The nonmagnetic layer 18 is then polished by, for example, CMP, until the bottom yoke layer 17 is exposed. This flattens the bottom yoke layer 17 and the nonmagnetic layer 18 at the top.

Figure 14A:
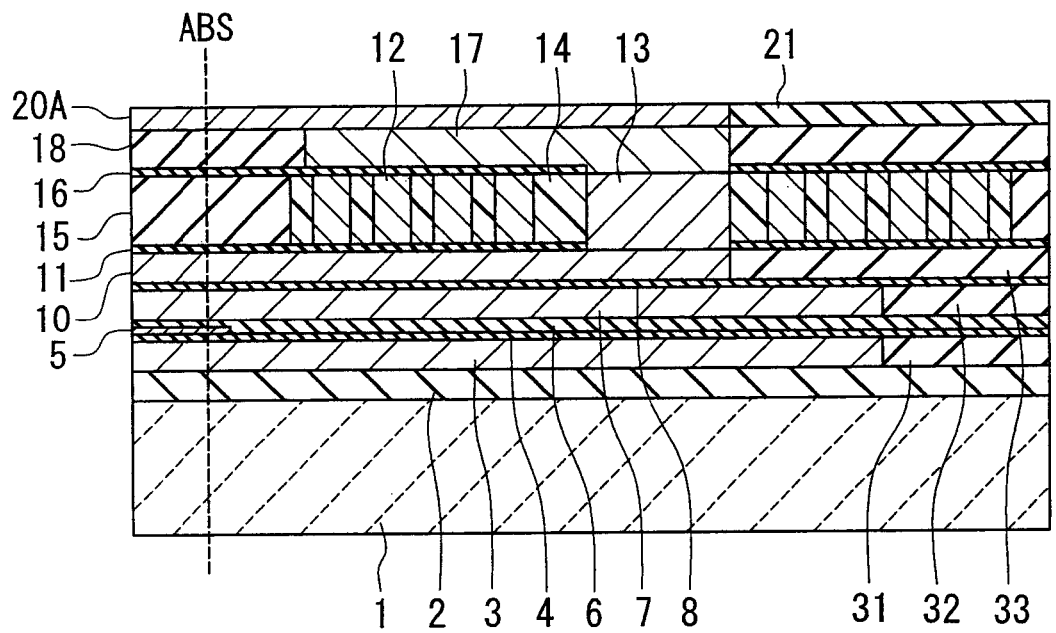
FIG. 14A and FIG. 14B are explanatory diagrams showing a step that follows the step of FIG. 13A and FIG. 13B.
Figure 14B:
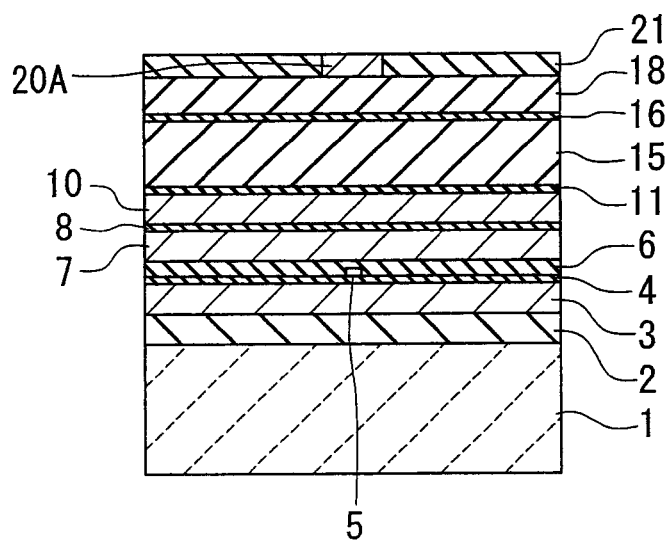

FIG. 14A and FIG. 14B show the next step. In this step, first, the first layer 20A is formed over the bottom yoke layer 17 and the nonmagnetic layer 18 by frame plating, for example. Next, the nonmagnetic layer 21 is formed over the entire top surface of the stack. The nonmagnetic layer 21 is then polished by, for example, CMP, until the first layer 20A is exposed. This flattens the first layer 20A and the nonmagnetic layer 21 at the top.

Figure 15A:
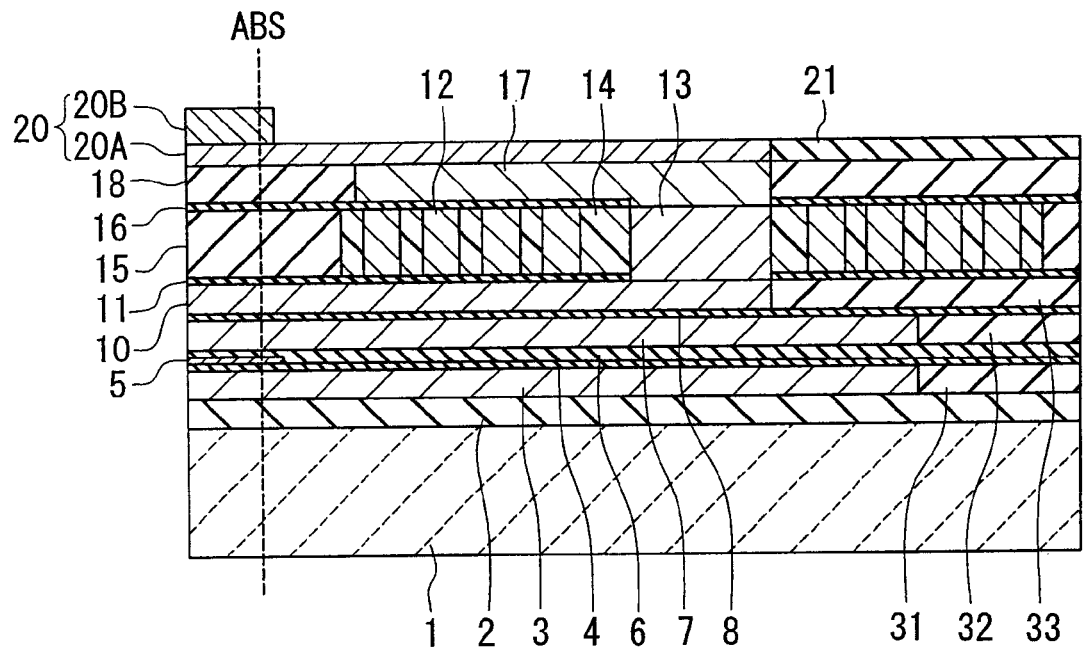
FIG. 15A and FIG. 15B are explanatory diagrams showing a step that follows the step of FIG. 14A and FIG. 14B.
Figure 15B:
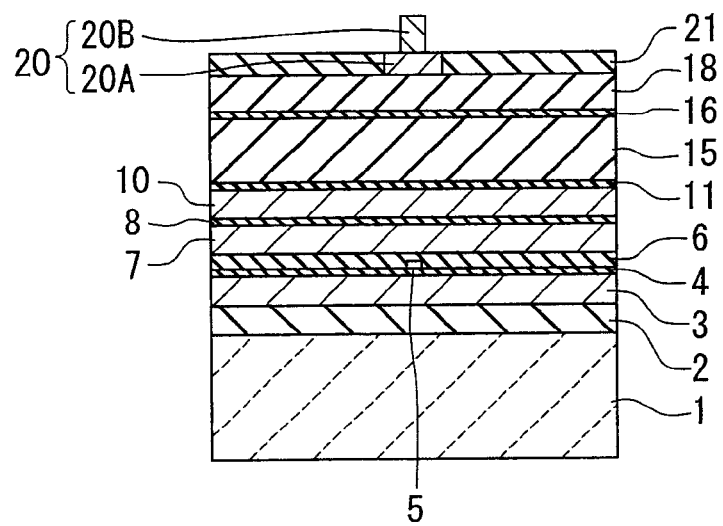

FIG. 15A and FIG. 15B show the next step. In this step, the second layer 20B is formed on the first layer 20A by frame plating, for example.

Figure 16A:
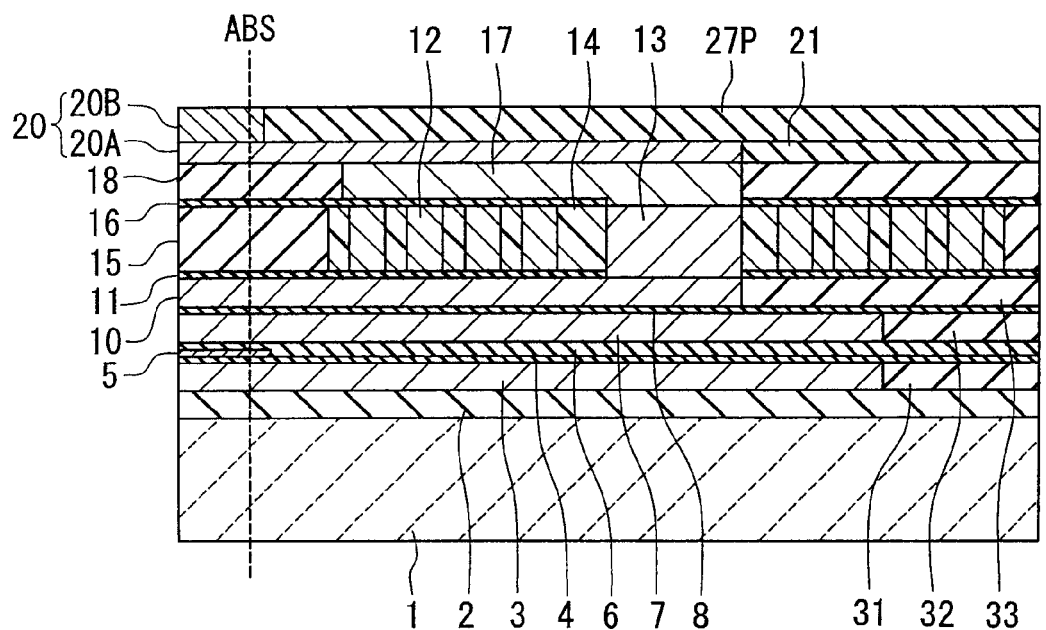
FIG. 16A and FIG. 16B are explanatory diagrams showing a step that follows the step of FIG. 15A and FIG. 15B.
Figure 16B:
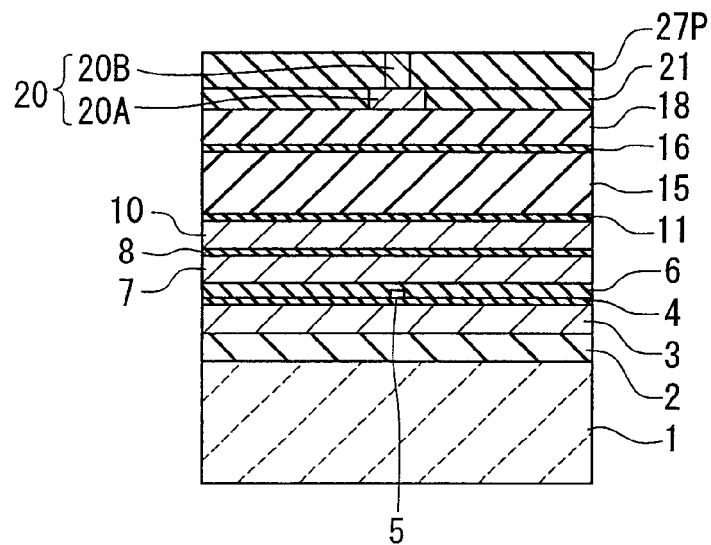

FIG. 16A and FIG. 16B show the next step. In this step, first, an initial support body 27P is formed over the entire top surface of the stack. The initial support body 27 is intended to undergo the formation of the groove 27A therein later to thereby become the reflecting film support body 27. The groove 27A has the inclined surfaces 272a and 272b. Next, the initial support body 27P is polished by, for example, CMP, until the second layer 20B is exposed. This flattens the second layer 20B and the initial support body 27P at the top.

Figure 17A:
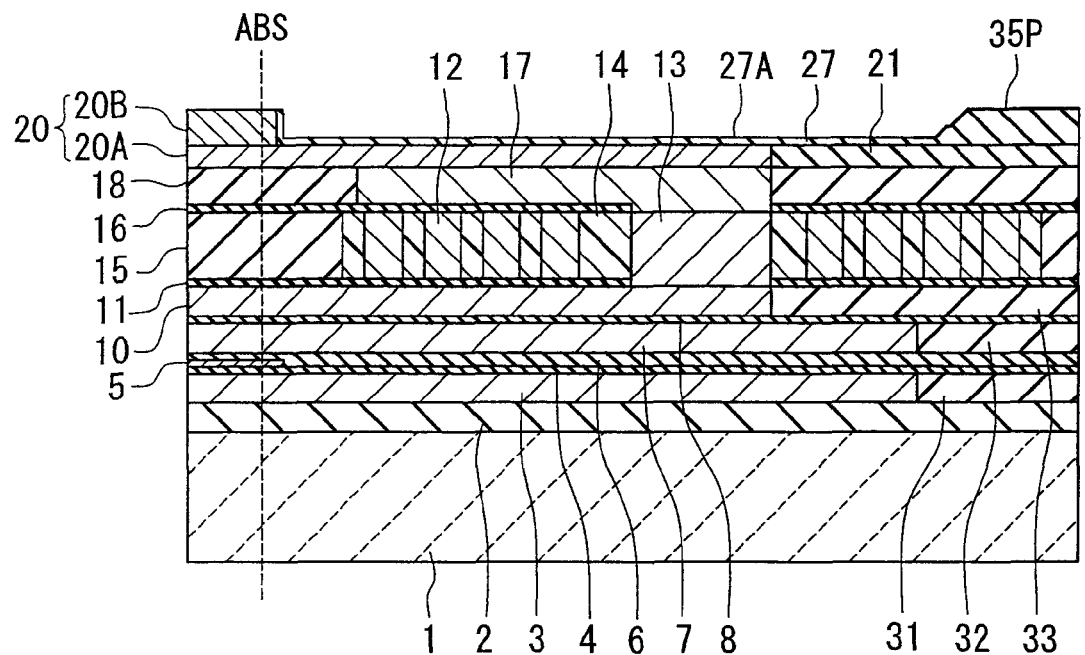
FIG. 17A and FIG. 17B are explanatory diagrams showing a step that follows the step of FIG. 16A and FIG. 16B.
Figure 17B:
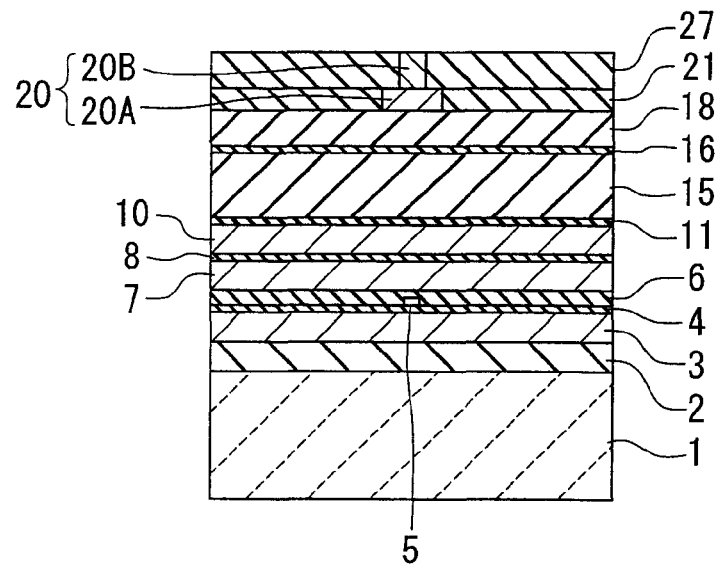

FIG. 17A and FIG. 17B show the next step. In this step, first, the groove 27A is formed in the initial support body 27P by selectively etching the initial support body 27P by reactive ion etching (hereinafter referred to as RIE). This makes the initial support body 27P into the reflecting film support body 27. Next, a metal film 35P, which is to become the reflecting film 35 later, is formed over at least the inclined surfaces 272a and 272b and the coupling surface 272c of the surface of the groove 27A of the reflecting film support body 27.

Figure 18A:
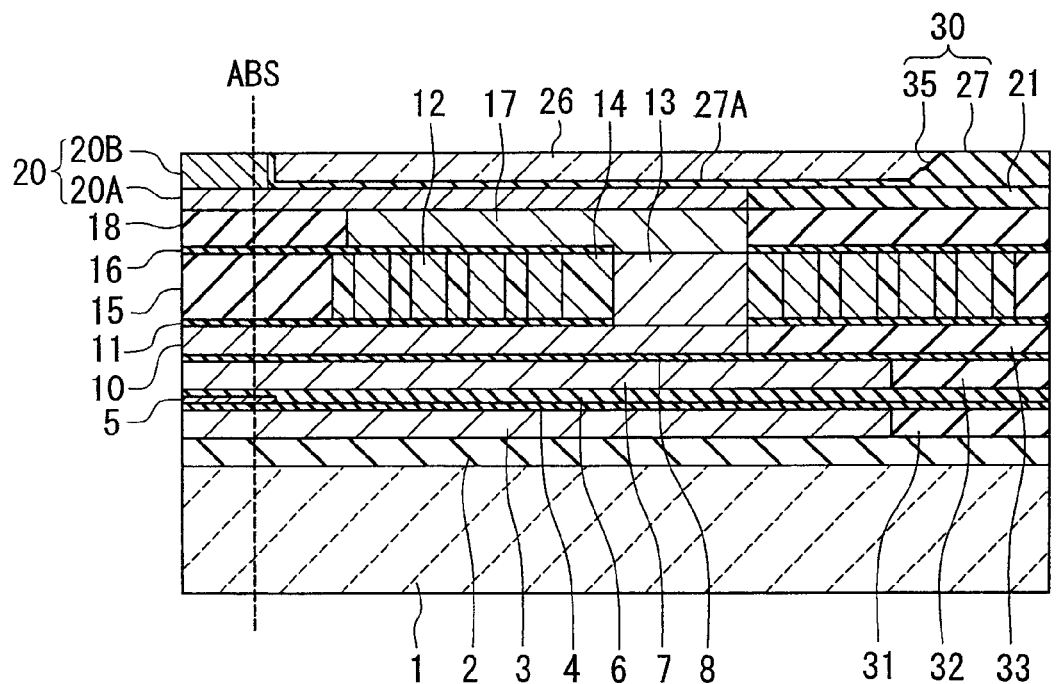
FIG. 18A and FIG. 18B are explanatory diagrams showing a step that follows the step of FIG. 17A and FIG. 17B.
Figure 18B:
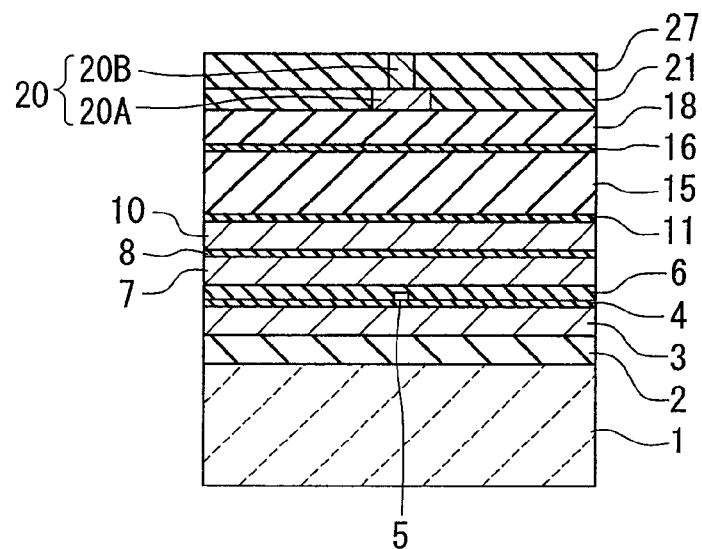

FIG. 18A and FIG. 18B show the next step. In this step, first, a dielectric layer that is to become the waveguide 26 later is formed over the entire top surface of the stack. Next, the dielectric layer and the metal film 35P are polished by, for example, CMP, until the second layer 20B and the reflecting film support body 27 are exposed. This flattens the second layer 20B, the reflecting film support body 27 and the dielectric layer at the top. As a result, the dielectric layer left in the groove 27A of the reflecting film support body 27 makes the waveguide 26. The metal film 35P left in the groove 27A of the reflecting film support body 27 makes the reflecting film 35. The series of steps for forming the waveguide 26, the reflecting film support body 27 and the reflecting film 35 will be described in more detail later.

Figure 19A:
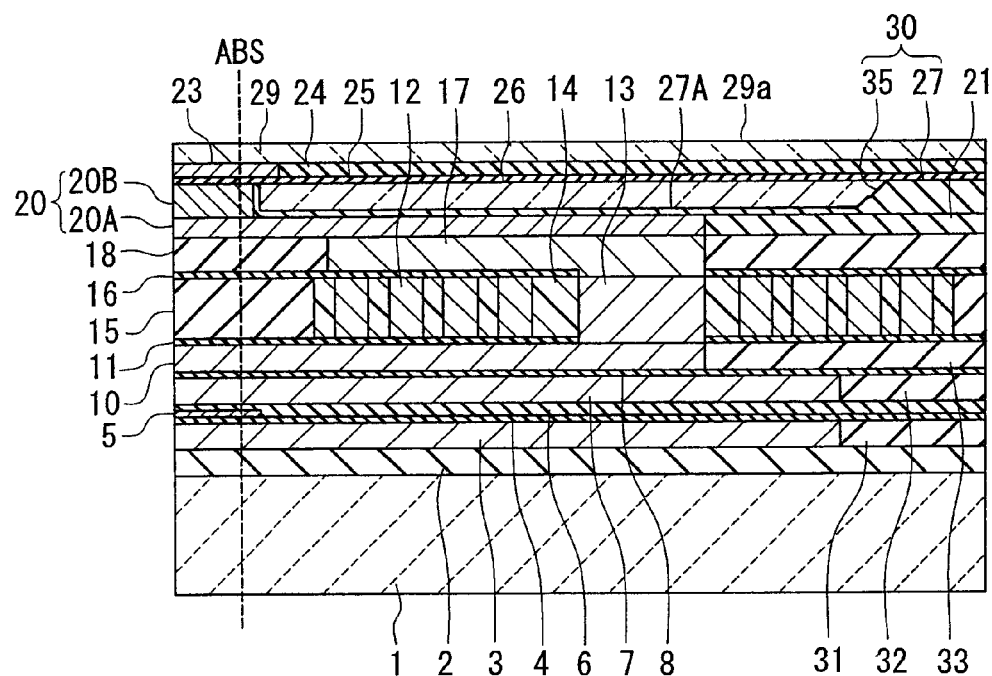
FIG. 19A and FIG. 19B are explanatory diagrams showing a step that 10 follows the step of FIG. 18A and FIG. 18B.
Figure 19B:
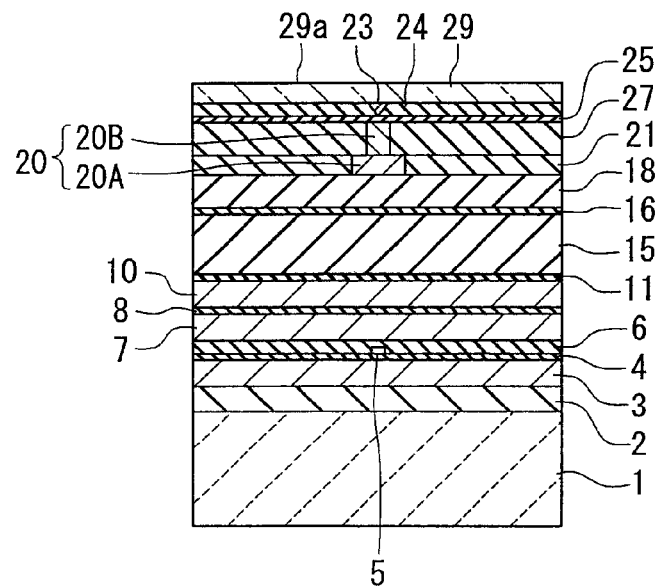

FIG. 19A and FIG. 19B show the next step. In this step, first, the interposition layer 25 is formed over the second layer 20B, the waveguide 26 and the reflecting film support body 27. Next, the clad layer 24 is formed on the interposition layer 25. The clad layer 24 is then selectively etched to form therein a groove for accommodating the near-field light generating element 23. Next, the near-field light generating element 23 is formed to be accommodated in the groove of the clad layer 24. Next, the clad layer 29 is formed over the entire top surface of the stack. Wiring, the terminals 210, and other components are then formed on the top surface 29a of the clad layer 29.

Figure 20A:
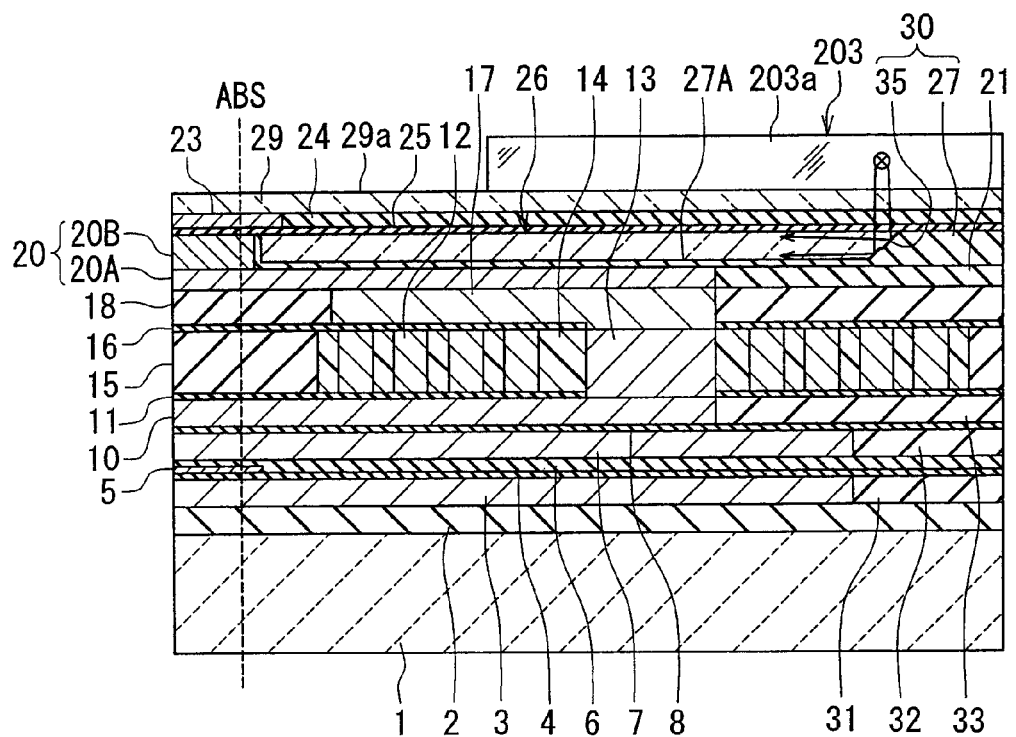
FIG. 20A and FIG. 20B are explanatory diagrams showing a step that follows the step of FIG. 19A and FIG. 19B.
Figure 20B:
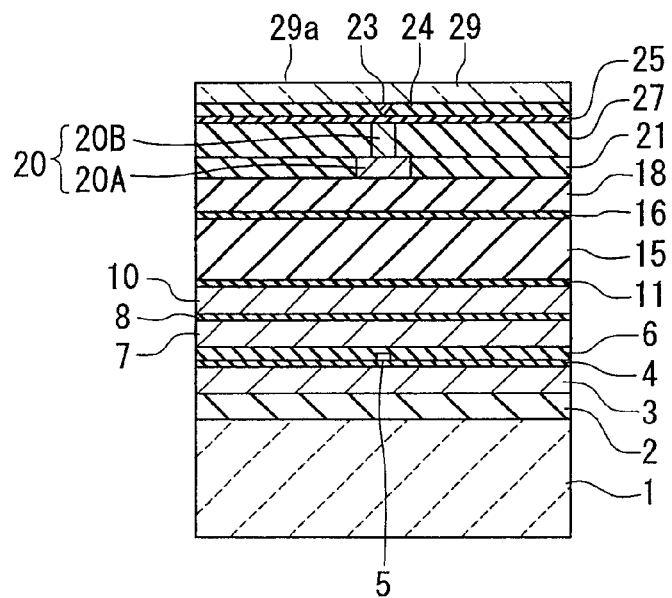

Next, as shown in FIG. 20A and FIG. 20B, the laser diode 202 with the external mirror 203 fixed thereto is fixed to the top surface 29a of the clad layer 29, i.e., the top surface 201c of the slider 201.

Next, the substrate is cut into sliders, and polishing of the medium facing surface 201a, fabrication of flying rails, etc. are performed to thereby complete the heat-assisted magnetic recording head.

Figure 26:
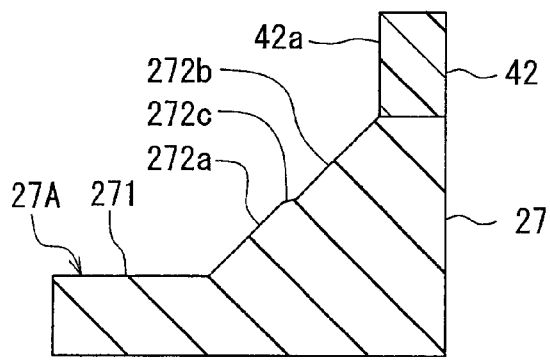
FIG. 26 is a cross-sectional view showing a step that follows the step of FIG. 25.
Figure 27:
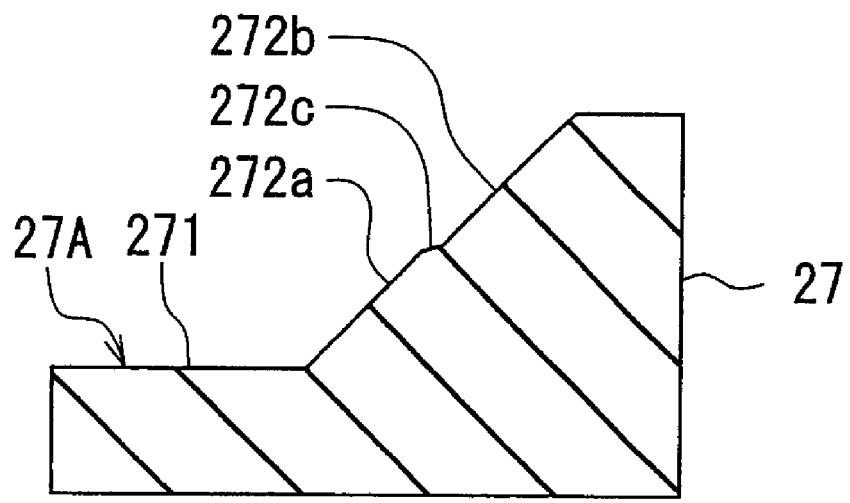
FIG. 27 is a cross-sectional view showing a step that follows the step of FIG. 26.
Figure 28:
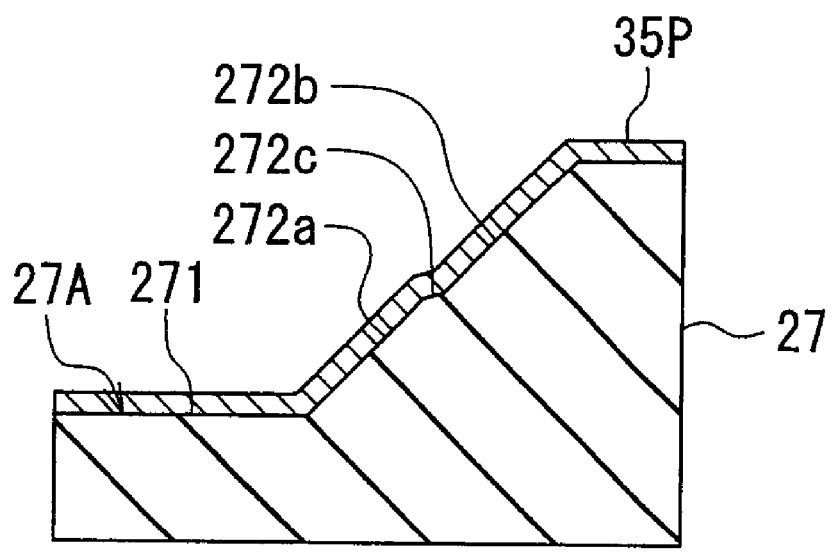
FIG. 28 is a cross-sectional view showing a step that follows the step of FIG. 27.

Now, the series of steps for forming the waveguide 26, the reflecting film support body 27 and the reflecting film 35 will be described in more detail with reference to FIG. 10 and FIG. 21 to FIG. 28. FIG. 21 to FIG. 28 each show a cross section of a part of a stack of layers in the process of manufacturing the heat-assisted magnetic recording head, the cross section being perpendicular to the medium facing surface 201a and the top surface 1a of the substrate 1. In FIG. 21 to FIG. 25, the portions lying closer to the substrate 1 than the initial support body 27P are omitted. In FIG. 26 to FIG. 28, the portions lying closer to the substrate 1 than the reflecting film support body 27 are omitted.

Figure 21:
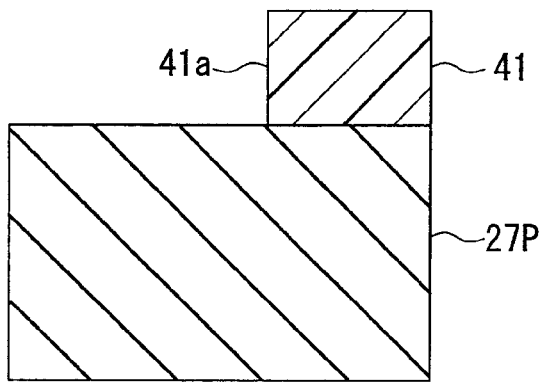
FIG. 21 is a cross-sectional view showing a step of a series of steps for forming the waveguide, the reflecting film support body, and the reflecting 15 film of the first embodiment of the invention.

FIG. 21 shows the step after the second layer 20B and the initial support body 27P shown in FIG. 16A and FIG. 16B are flattened at the top. In this step, a first etching mask 41 is formed on the top surface of the initial support body 27P. The etching mask 41 is formed by patterning a photoresist layer by photolithography, for example. The etching mask 41 has an opening that has a shape corresponding to the planar shape of the waveguide 26. The etching mask 41 covers a part of the initial support body 27P except the area where the first inclined surface 272a is to be formed later as viewed in the direction perpendicular to the top surface 1a of the substrate 1. In FIG. 21, the etching mask 41 has a side surface 41a that is closer to the position where the medium facing surface 201a is to be formed. A metal mask that has an opening having a shape corresponding to the planar shape of the waveguide 26 may be formed between the initial support body 27P and the etching mask 41. The metal mask may be made of Ta, for example.

Figure 22:
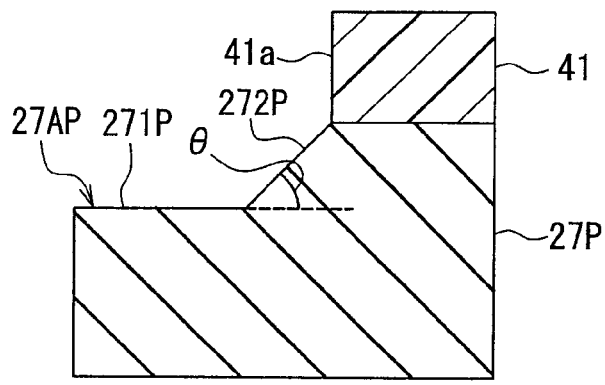
FIG. 22 is a cross-sectional view showing a step that follows the step of FIG. 21.

FIG. 22 shows the next step. In this step, the initial support body 27P is taper-etched by RIE using the etching mask 41. This step will be referred to as a first etching step.

As shown in FIG. 22, the taper-etching of the initial support body 27P forms an initial groove 27AP in the initial support body 27P. The initial groove 27AP has an initial bottom 271P, an initial inclined surface 272P, and not-shown initial sidewalls. The initial inclined surface 272P is inclined with respect to the direction perpendicular to the top surface 1a of the substrate 1. Suppose, for example, that the initial support body 27P is made of alumina ($Al_2O_3$). In this case, in the first etching step, the initial support body 27P is taper-etched by RIE using an etching gas that contains $BCl_3$, $Cl_2$, and one of $CF_4$ and $N_2$. $BCl_3$ and $Cl_2$ are the main components that contribute to the etching of the initial support body 27P. $CF_4$ and $N_2$ are gases for forming a sidewall-protecting film on the sidewalls of the etched groove while the etching of the initial support body 27P is in process.

Since the etching gas contains $CF_4$ or $N_2$, a sidewall-protecting film is formed on the sidewalls of the groove during the etching of the initial support body 27P. This makes the initial inclined surface 272P inclined with respect to the direction perpendicular to the top surface 1a of the substrate 1. Note that the not-shown initial sidewalls are also inclined with respect to the direction perpendicular to the top surface 1a of the substrate 1.

As shown in FIG. 22, the symbol θ represents the angle formed by the initial inclined surface 272P with respect to the initial bottom 271P. The angle θ is controllable within the range of 15° to 90° by changing the ratio of the flow rate of $CF_4$ or $N_2$ to the total flow rate of the etching gas. If the ratios of the flow rates of $CF_4$ and $N_2$ to the total flow rate of the etching gas are both 0%, the angle θ becomes 90°. If the etching gas contains $N_2$ and the ratio of the flow rate of $N_2$ to the total flow rate of the etching gas is 8%, the angle θ becomes 45°. If the ratio of the flow rate of $N_2$ to the total flow rate of the etching gas is 20%, the angle θ becomes 20°. If the etching gas contains $CF_4$ instead of $N_2$, the ratio of the flow rate of $CF_4$ to the total flow rate of the etching gas to form the same angle θ is approximately twice that of the flow rate of $N_2$ to the total flow rate of the etching gas. For example, when the etching gas contains $BCl_3$, $Cl_2$, and $CF_4$, an angle θ of 45° is obtained by setting the $BCl_3$ flow rate to 80 sccm, the $Cl_2$ flow rate to 15 sccm, and the $CF_4$ flow rate to 17 sccm. In this case, given an etching time of 720 sec, the etching forms a groove of 1 pm in depth in the initial support body 27P. When the etching gas contains $BCl_3$, $Cl_2$, and $N_2$, the flow rates of $BCl_3$, $Cl_2$, and $N_2$ are set to 80, 15, and 23 sccm, respectively. In this case, given an etching time of 400 sec, the etching forms a groove of 20° in angle θ and 0.5 tim in depth in the initial support body 27P.

An example will be given of the conditions for the first etching step other than the etching gas. This example employs an RIE system that uses a high frequency coil to produce plasma in a chamber by electromagnetic induction. The source power to the high frequency coil is 1200 W, with a high frequency bias power of 25 W and a chamber pressure of 0.3 Pa.

In the first etching step, the initial support body 27P is taper-etched so that the initial inclined surface 272P forms an angle of, for example, 45° with respect to the direction perpendicular to the top surface 1a of the substrate 1. The depth of the initial groove 27AP (the distance between the top surface of the initial support body 27P and the initial bottom 271P) is 0.5 for example. After the first etching step, the not-shown initial sidewalls may be etched by RIE so that the not-shown initial sidewalls become perpendicular to the top surface 1a of the substrate 1. In such a case, the initial inclined surface 272P may be covered with a photoresist mask.

Figure 23:
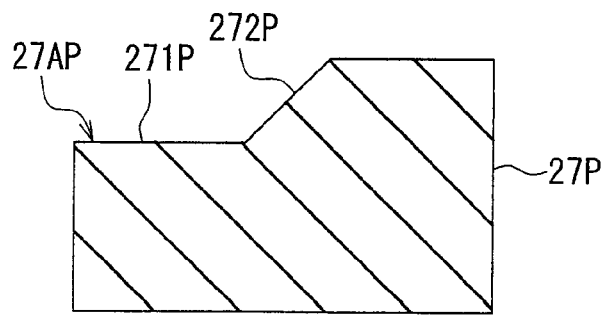
FIG. 23 is a cross-sectional view showing a step that follows the step of FIG. 22.

FIG. 23 shows the next step. In this step, the etching mask 41 is removed by, for example, stripping using an organic resist remover or by ashing using an 02-containing ashing gas.

Figure 24:
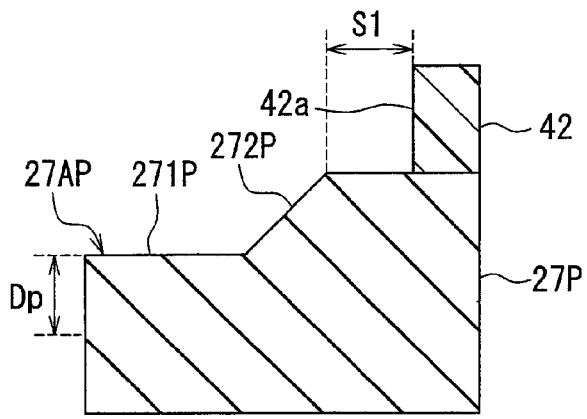
FIG. 24 is a cross-sectional view showing a step that follows the step of FIG. 23.

FIG. 24 shows the next step. In this step, first, a second etching mask 42 is formed on the top surface of the initial support body 27P. The etching mask 42 is formed by patterning a photoresist layer by photolithography, for example. The etching mask 42 has an opening that has a shape corresponding to the planar shape of the waveguide 26. The etching mask 42 covers a part of the initial support body 27P except the area where the inclined surfaces 272a and 272b are to be formed later as viewed in the direction perpendicular to the top surface 1a of the substrate 1. In FIG. 24, the etching mask 42 has a side surface 42a that is closer to the position where the medium facing surface 201a is to be formed. As compared with the side surface 41a of the etching mask 41, the side surface 42a is located farther from the position where the medium facing surface 201a is to be formed.

Figure 25:
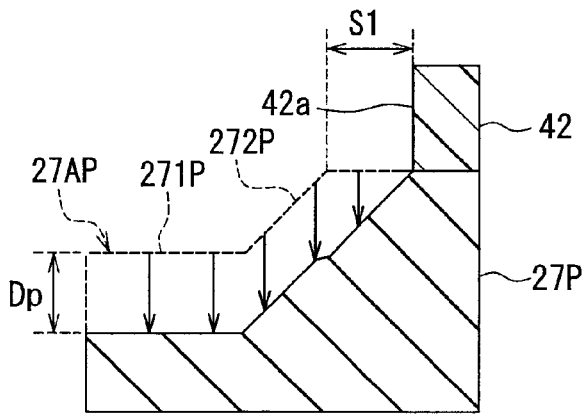
FIG. 25 is a cross-sectional view showing a step that follows the step of FIG. 24.

FIG. 25 shows the next step. In this step, the initial support body 27P is taper-etched by RIE using the etching mask 42. This step will be referred to as a second etching step. The etching conditions employed in the second etching step are the same as those employed in the first etching step. FIG. 26 shows the state after the second etching step.

FIG. 26 shows a part of the stack after the initial support body 27P is taper-etched in the second etching step. As shown in FIG. 26, the taper-etching of the initial support body 27P forms the groove 27A in the initial support body 27P. This completes the bottom 271 and the inclined surfaces 272a and 272b, and thereby makes the initial support body 27P into the reflecting film support body 27. After the second etching step, not-shown sidewalls of the groove 27A may be etched by RIE so that the sidewalls become perpendicular to the top surface 1a of the substrate 1. In such a case, the inclined surfaces 272a and 272b and the coupling surface 272c may be covered with a photoresist mask.

In the second etching step, the initial support body 27P is taper-etched by RIE using an etching gas that contains at least $BCl_3$, $Cl_2$ and $CF_4$ out of $BCl_3$, $Cl_2$, $CF_4$ and $N_4$ so that each of the inclined surfaces 272a and 272b forms an angle of 45° with respect to the direction perpendicular to the top surface 1a of the substrate 1. The depth of the groove 27A (the distance between the top surface of the reflecting film support body 27 and the bottom 271) is 1 pm, for example.

Now, the second etching step will be described in more detail with reference to FIG. 24 to FIG. 26. In the second etching step, the initial support body 27P is taper-etched by utilizing the characteristic of RIE to be described below. When the initial support body 27P is etched by RIE using an etching gas that contains $CF_4$ or $N_2$, a sidewall-protecting film is formed on the sidewalls of the groove that is formed in the initial support body 27P by the etching. The initial support body 27P is thus taper-etched in the portions near the etching mask 42. At the same time, the initial support body 27P is perpendicularly etched in the portions away from the etching mask 42. Because of such a characteristic of RIE, in the second etching step, the initial bottom 271P of the initial support body 27P and the portion of the initial support body 27P under the initial inclined surface 272P are etched to form the bottom 271 and the inclined surface 272a. Meanwhile, the portion of the initial support body 27P not etched in the first etching step is etched to form the inclined surface 272b.

In the second etching step, the inclined surfaces 272a and 272b may be formed so that the inclined surface 272b is offset in a direction perpendicular to the inclined surface 272a with respect to a virtual plane that includes the inclined surface 272a. In such a case, the coupling surface 272c is formed so as to couple the inclined surfaces 272a and 272b to each other.

As shown in FIG. 24 and FIG. 25, the distance between the side surface 41a of the etching mask 41 and the side surface 42a of the etching mask 42 will be represented by the symbol Si. The etching depth of the second etching step (the distance between the initial bottom 271P and the bottom 271) will be represented by the symbol Dp. If the inclined surface 272b is intended to form an angle of 45° with respect to the direction perpendicular to the top surface 1a of the substrate 1, S1 is designed to be equal or nearly equal to Dp. It is preferred that S1 be 0.8 to 1.2 times Dp.

When the inclined surface 272b forms an angle of 45° with respect to the direction perpendicular to the top surface 1a of the substrate 1 and S1/Dp is 1, the inclined surfaces 272a and 272b ideally fall on an identical plane without the formation of the coupling surface 272c. The manufacturing method for the heat-assisted magnetic recording head 200 according to the embodiment also covers such a case.

Suppose that the inclined surface 272b forms an angle of 45° with respect to the direction perpendicular to the top surface 1a of the substrate 1 and 51/Dp is other than 1. In such a case, the inclined surfaces 272a and 272b are formed so that the inclined surface 272b is offset in the direction perpendicular to the inclined surface 272a with respect to the virtual plane including the inclined surface 272a, and there is formed the coupling surface 272c. In particular, if S1/Dp is greater than 1, as shown in FIG. 26, the angle formed by the coupling surface 272c with respect to the direction perpendicular to the top surface 1a of the substrate 1 is greater than the angle formed by each of the inclined surfaces 272a and 272b with respect to the direction perpendicular to the top surface 1a of the substrate 1.

FIG. 27 shows the next step. In this step, the etching mask 42 is removed by, for example, stripping using an organic resist remover or by ashing using an O2-containing ashing gas.

FIG. 28 shows the next step. In this step, a metal film 35P, which is to become the reflecting film 35 later, is formed over the inclined surfaces 272a and 272b and the coupling surface 272c. The metal film 35P is formed also on a part of the top surface of the reflecting film support body 27 and a part of the bottom 271.

The steps after the step of FIG. 28 up to the formation of the waveguide 26 and the internal mirror 30 will be described with reference to FIG. 10. After the step of FIG. 28, a dielectric layer that is to become the wave guide 26 later is initially formed over the entire top surface of the stack. Next, the dielectric layer and the metal film 35P are polished by, for example, CMP, until the second layer 20B and the reflecting film support body 27 are exposed. This flattens the second layer 20B, the reflecting film support body 27 and the dielectric layer at the top. As a result, the dielectric layer left in the groove 27A makes the waveguide 26. The metal film 35P left in the groove 27A makes the reflecting film 35. The internal mirror 30 is thereby completed.

As has been described, in the heat-assisted magnetic recording head 200 according to the present embodiment, the laser diode 202 is fixed to the top surface 201c of the slider 201. The laser light emitted from the emission part 222a of the laser diode 202 is reflected by the reflecting surface of the reflecting part 203a of the external mirror 203, passes through the clad layer 29, the clad layer 24 and the interposition layer 25, enters the waveguide 26 from the top surface 26c to reach the rear end face 26b, where the laser light is reflected by the internal mirror 30 so as to travel through the waveguide 26 toward the medium facing surface 201a (the front end face 26a).

The internal mirror 30 includes the reflecting film support body 27 and the reflecting film 35. The reflecting film support body 27 includes the first inclined surface 272a and the second inclined surface 272b. With respect to a virtual plane that includes the first inclined surface 272a, the second inclined surface 272b is offset in the direction perpendicular to the first inclined surface 272a. The reflecting film 35 includes the first portion 351 located on the first inclined surface 272a, and the second portion 352 located on the second inclined surface 272b. The first portion 351 includes the first reflecting surface 351a, and the second portion 352 includes the second reflecting surface 352a. With respect to a virtual plane that includes the first reflecting surface 351a, the second reflecting surface 352a is offset in the direction perpendicular to the first reflecting surface 351a.

The effects of the present embodiment will now be described. A description will initially be given of problems that are associated with the formation of an internal mirror that has a single reflecting surface of large dimension in the depth direction. When taper-etching an insulating layer such as the initial support body 27P of alumina, the etching rate is typically lower than when etching the insulating layer perpendicularly. Given the same etching depth, a photoresist etching mask of greater thickness is therefore needed to taper-etch the insulating layer than when etching the insulating layer perpendicularly. Thicker etching masks, however, can lose their shape more easily due to plasma-based reticulation and the like during etching.

Suppose, for example, that a 4-μm-thick photoresist etching mask is formed on the initial support body 27P, and the initial support body 27P is taper-etched to form an inclined surface at an angle of 45° with respect to the direction perpendicular to the top surface 1a of the substrate 1. In such a case, the maximum etching depth up to which a plane inclined surface can be formed is around 1 Rm. If the etching mask exceeds 4 [Am in thickness, the etching mask will become deformed and it becomes difficult to form a plane inclined surface. The maximum etching depth at which a plane inclined surface can be precisely formed by a single taper-etching operation is thus 1 [tin or so. [?]

The laser light has a diameter of, for example, 1 to 2 tAm when incident on the reflecting surface of the internal mirror. Since the laser light may have a maximum displacement of 1 Rni or so because of positioning errors when fixing the laser diode 202 to the top surface 201a of the slider 201, the reflecting surface needs to have a dimension of 2 to 4 it in or so in the depth direction. To form a single reflecting surface of such a dimension, a single, plane inclined surface having a dimension of around 2 to 4 [tm in the depth direction needs to be formed in the initial support body 27P. As discussed previously, however, it is difficult to form a single, plane inclined surface of such a dimension precisely by a single taper-etching operation. If a single reflecting surface is formed with a dimension as large as 2 to 4 [tm in the depth direction, the reflecting surface is no longer plane. This consequently reduces the amount of laser light that is reflected by the reflecting surface and travels in a desired direction, and thus reduces the use efficiency of the laser light that is used to generate near-field light.

In the present embodiment, the reflecting film support body 27 includes the first inclined surface 272a and the second inclined surface 272b. The first inclined surface 272a and the second inclined surface 272b can be formed through a plurality of steps including two taper-etching operations, for example. As compared with the case of forming a single, plane inclined surface of large dimension, the first and second inclined surfaces 272a and 272b can be formed with higher precision. Consequently, according to the present embodiment, the first and second reflecting surfaces 351a and 352a can also be formed with high precision. The present embodiment thus makes it possible to prevent a drop in use efficiency of the laser light due to the internal mirror 30.

In the manufacturing method for the heat-assisted magnetic recording head 200 according to the present embodiment, the step of forming the reflecting film support body 27 includes the step of forming the initial support body 27P and the step of etching the initial support body 27P. The step of etching the initial support body 27P includes the first and second etching steps of taper-etching the initial support body 27P. The first and second inclined surfaces 272a and 272b are completed after the second etching step. According to this manufacturing method, the first and second inclined surfaces 272a and 272b can be formed with higher precision as compared with the case of forming a single, plane inclined surface of large dimension. Consequently, according to the present embodiment, the first and second reflecting surfaces 351a and 352a can also be formed with high precision. The present embodiment thus makes it possible to prevent a drop in use efficiency of the laser light due to the internal mirror 30.

Now, let us consider the dimension of the coupling surface 272c in the direction perpendicular to the medium facing surface 201a (hereinafter, referred to as the width of the coupling surface 272c) and the dimension of the coupling surface 353a in the direction perpendicular to the medium facing surface 201a (hereinafter, referred to as the width of the coupling surface 353a). The width of the coupling surface 353a depends on the width of the coupling surface 272c. As mentioned previously, the coupling surface 272c is produced when S1/Dp is other than 1. If S1/Dp is greater than 1, the angle formed by the coupling surface 272c with respect to the direction perpendicular to the top surface 1a of the substrate 1 is greater than the angle formed by each of the inclined surfaces 272a and 272b with respect to the direction perpendicular to the top surface 1a of the substrate 1. Consequently, as shown in FIG. 10, the angle formed by the coupling surface 353a with respect to the direction perpendicular to the top surface 1a of the substrate 1 is greater than the angle formed by each of the reflecting surfaces 351a and 352a with respect to the direction perpendicular to the top surface 1a of the substrate 1. If S1/Dp is too large, the width of the coupling surface 272c becomes too large and the width of the coupling surface 353a also becomes too large. In this case, the proportion of light that is incident on the reflecting film 35 and is reflected off the coupling surface 353a so as not to travel through the waveguide 26 toward the medium facing surface 201a becomes so high that the light use efficiency drops. In view of this, it is preferred that S1/Dp be 1.2 or less. Situations where S1/Dp is less than 1 will be dealt with in a second embodiment.

Even when the etching masks 41 and 42 are intended to be formed so that Si/Dp=1, the positions of the etching masks 41 and 42 may deviate slightly from the desired positions because of positioning errors when forming the etching masks 41 and 42 by photolithography. Variations of S1 ascribable to such positioning errors can be around 0.1 !AM at most. The widths of the coupling surfaces 272c and 353a resulting from the positioning errors can also be around 0.1 p.m at most. Here, suppose that the reflecting surfaces 351a and 352a each have a dimension of 0.5 p.m in the direction perpendicular to the medium facing surface 201a, the coupling surface 353a has a width of 0.1 pm, and the laser light incident on the reflecting film 35 has a diameter of 1 p.m. In such a case, 90% of the laser light incident on the reflecting film 35 can be reflected by the reflecting surfaces 351a and 352a so as to travel through the waveguide 26 toward the medium facing surface 201a (the front end face 26a).

Other effects of the present embodiment will now be described. In the present embodiment, the opposed portion 26g of the outer surface of the waveguide 26 is opposed to a part of the edge part 23f of the near-field light generating element 23 and its vicinity with the interposition layer 25 interposed therebetween. In the present embodiment, evanescent light occurs from the interposition layer 25 based on the light propagating through the waveguide 26. Based on this evanescent light, surface plasmons are excited on the near-field light generating element 23. The surface plasmons then propagate to the near-field light generating part 23g, and the near-field light generating part 23g generates near-field light based on the surface plasmons. According to the present embodiment, it is possible to increase the efficiency of conversion of the light propagating through the waveguide 26 into the near-field light, as compared with the case where a plasmon antenna is directly irradiated with laser light to produce near-field light.

According to the present embodiment, it is possible suppress a temperature rise of the near-field light generating element 23 because the near-field light generating element 23 is not directly irradiated with the laser light propagating through the waveguide 26. In the present embodiment, the length HPA of the near-field light generating element 23 in the direction perpendicular to the medium facing surface 201a is greater than the length TPA of the first end face 23a in the direction perpendicular to the top surface 1a of the substrate 1. Thus, the near-field light generating element 23 of the present embodiment is greater in volume than a conventional plasmon antenna in which the length in the direction perpendicular to the medium facing surface 201a is smaller than the length in the direction perpendicular to the top surface 1a of the substrate 1. This also contributes to suppression of a temperature rise of the near-field light generating element 23. Consequently, according to the present embodiment, it is possible to prevent the near-field light generating element 23 from protruding from the medium facing surface 201a.

In the heat-assisted magnetic recording head 200 according to the present embodiment, the edge-emitting laser diode 202 is used as the light source for emitting the light to be used for generating near-field light. Typically, edge-emitting laser diodes have higher optical output as compared with surface-emitting laser diodes.

The laser diode 202 is fixed to the slider 201 such that the bottom surface 202a lying at an end in the direction perpendicular to the plane of the active layer 222 faces the top surface 201c of the slider 201. The laser light emitted from the emission part 222a of the laser diode 202 is reflected by the external mirror 203 toward the waveguide 26. The bottom surface 202a of the laser diode 202 is parallel to the plane of the active layer 222 and has an area greater than that of the emitting end face 202c. In the present embodiment, it is therefore easy to position the laser diode 202 with respect to the slider 201 with high precision so that the optical axis of the laser light emitted from the emission part 222a is parallel to the top surface 201c of the slider 201. Thus, according to the present embodiment, the optical axis of the laser light emitted from the emission part 222a can be prevented from tilting with respect to a desired direction. According to the present embodiment, it is therefore possible, while using the edge-emitting laser diode 202 having a high optical output as the light source for emitting light to be used for generating near-field light, to align the laser light with the waveguide easily as compared to the case where the laser light emitted from the emission part 222a is made incident directly on the waveguide.

In the present embodiment, as shown in FIG. 1 and FIG. 2, the laser diode 202, the external mirror 203, the internal mirror 30, and the wave guide 26 are arranged so that the direction of travel of the laser light L1 emitted from the emission part 222a and the direction of travel of the laser light L3 reflected by the internal mirror 30 are orthogonal to each other as viewed from above the top surface 201c of the slider 201. According to the present embodiment, such arrangement allows the direction of polarization (the direction of oscillation of the electric field) of the laser light L3 reflected by the internal mirror 30 to be orthogonal to the direction of polarization of the laser light L1 emitted from the emission part 222a, as shown in FIG. 2. Consequently, the present embodiment makes it possible that the direction of polarization of the laser light propagating through the waveguide 26 is set to such a direction that surface plasmons of high intensity can be generated on the near-field light generating element 23, i.e., the direction perpendicular to the opposed portion 26g, while using a typical laser diode that emits laser light of TE mode as the laser diode 202.

In the heat-assisted magnetic recording head 200 according to the present embodiment, the near-field light generating element 23 is located farther from the top surface 1a of the substrate 1 than is the second layer 20B of the magnetic pole 20, and the waveguide 26 is located farther from the top surface 1a of the substrate 1 than is the first layer 20A of the magnetic pole 20. The light emitted from the laser diode 202 disposed above the waveguide 26 is reflected by the internal mirror 30 so as to travel through the waveguide 26 toward the medium facing surface 201a.

A case will now be considered where a near-field light generating element and a waveguide are located closer to the top surface 1a of the surface 1 than is the magnetic pole 20. In such a case, since the magnetic pole 20 lies above the near-field light generating element and the waveguide, the optical path from the laser diode to the waveguide becomes longer and the energy loss of the light increases if the laser diode is disposed above the waveguide as in the present embodiment. The longer optical path from the laser diode to the waveguide also makes it harder to precisely position the laser diode and the waveguide, thus often resulting in energy loss of the light due to misalignment between the laser diode and the waveguide.

In contrast, the present embodiment allows shortening the optical path from the laser diode 202 to the waveguide 26, thus making it possible to guide the light from the laser diode 202 to the opposed portion 26g of the outer surface of the waveguide 26 through a shorter path. According to the present embodiment, it is therefore possible to reduce the energy loss of the light. Furthermore, the present embodiment allows the laser diode 202 and the waveguide 26 to be put close to each other, which facilitates precise positioning of the laser diode 202 and the waveguide 26. Consequently, according to the present embodiment, it is possible to reduce the energy loss of the light resulting from misalignment between the laser diode 202 and the waveguide 26.

In the present embodiment, the distance D1 between the bottom surface 2202A and the emission part 222a of the laser diode 202 is smaller than the distance D2 between the top surface 2202b and the emission part 222a of the laser diode 202. The laser light emitted from the emission part 222a of the laser diode 202 increases in diameter with increasing distance from the emission part 222a. If the distance D1 is greater than the distance D2, the path of the laser light from the emission part 222a to the internal mirror 30 becomes long, and accordingly, part of the laser light may fail to be incident on the internal mirror 30, thereby causing a drop in the amount of the laser light that propagates through the waveguide 26. According to the present embodiment, in contrast, it is possible to make the path of the laser light from the emission part 222a to the internal mirror 30 smaller than in the case where the distance D1 is greater than the distance D2. The present embodiment thus allows the laser light to be incident on the internal mirror 30 with a smaller diameter. Consequently, according to the present embodiment, it is possible to prevent a drop in the amount of the laser light that propagates through the waveguide 26 due to the failure of incidence of part of the laser light on the reflecting surfaces 351a and 352a of the reflecting film 35 of the internal mirror 30.

In the present embodiment, the external mirror 203 can be formed by, for example, molding a body out of an insulating material such as resin or glass, and forming a metal film on at least a part of the body that is to make the reflecting surface by vapor deposition, sputtering, or the like. The part of the body to make the reflecting surface may be polished before the formation of the metal film. It is thereby possible to prevent the reflecting surface from being rounded at the portion near the border between the reflecting part 203a and the to-be-fixed part 203c. This provides the following effect. As mentioned above, the laser light emitted from the emission part 222a increases in diameter with increasing distance from the emission part 222a. Thus, the longer the path of the laser light from the emission part 222a to the reflecting surface of the reflecting part 203a, the larger the diameter of the laser light reflected by the reflecting surface. If, as described above, the part of the body to make the reflecting surface is polished before forming the metal film so as to prevent the reflecting surface from being rounded at the portion near the border between the reflecting part 203a and the to-be-fixed part 203c, it becomes possible that the laser light emitted from the emission part 222a is reflected at a point on the reflecting surface closer to the border between the reflecting part 203a and the to-be-fixed part 203c. Consequently, the path of the laser light from the emission part 222a to the reflecting surface can be reduced to prevent the diameter of the laser light reflected by the reflecting surface from being too large.

In the present embodiment, the interposition layer 25 having a refractive index lower than that of the waveguide 26 is disposed on the top surface of the waveguide 26 on which the laser light is to be incident. Light that is incident on the interface between the waveguide 26 and the interposition layer 25 from the side of the waveguide 26 at incident angles greater than or equal to the critical angle is thus totally reflected at the interface. Consequently, the laser light that is emitted from the laser diode 202 and passes through the clad layer 29, the clad layer 24 and the interposition layer 25 to enter the waveguide 26 can be prevented from again passing through the interposition layer 25, the clad layer 24 and the clad layer 29 to return to the laser diode 202. According to the present embodiment, it is therefore possible to increase the use efficiency of the laser light and to prevent the laser diode 202 from being damaged by the laser light that returns to the laser diode 202.

From the foregoing, the present embodiment makes it possible to increase the use efficiency of the light used for generating near-field light in the heat-assisted magnetic recording head.

In the present embodiment, the initial support body 27P may be taper-etched more than twice with etching masks in respective different positions so as to form three or more inclined surfaces in the reflecting film support body 27. It follows that the reflecting film 35 has three or more portions that are respectively located on the three or more inclined surfaces of the reflecting film support body 27, and each of the three or more portions has a reflecting surface. In such a case, the total size of the three or more reflecting surfaces of the reflecting film 35 can be made greater both in the direction perpendicular to the top surface 1a of the substrate 1 and in the direction perpendicular to the medium facing surface 201a.

Modification Examples

Figure 29:
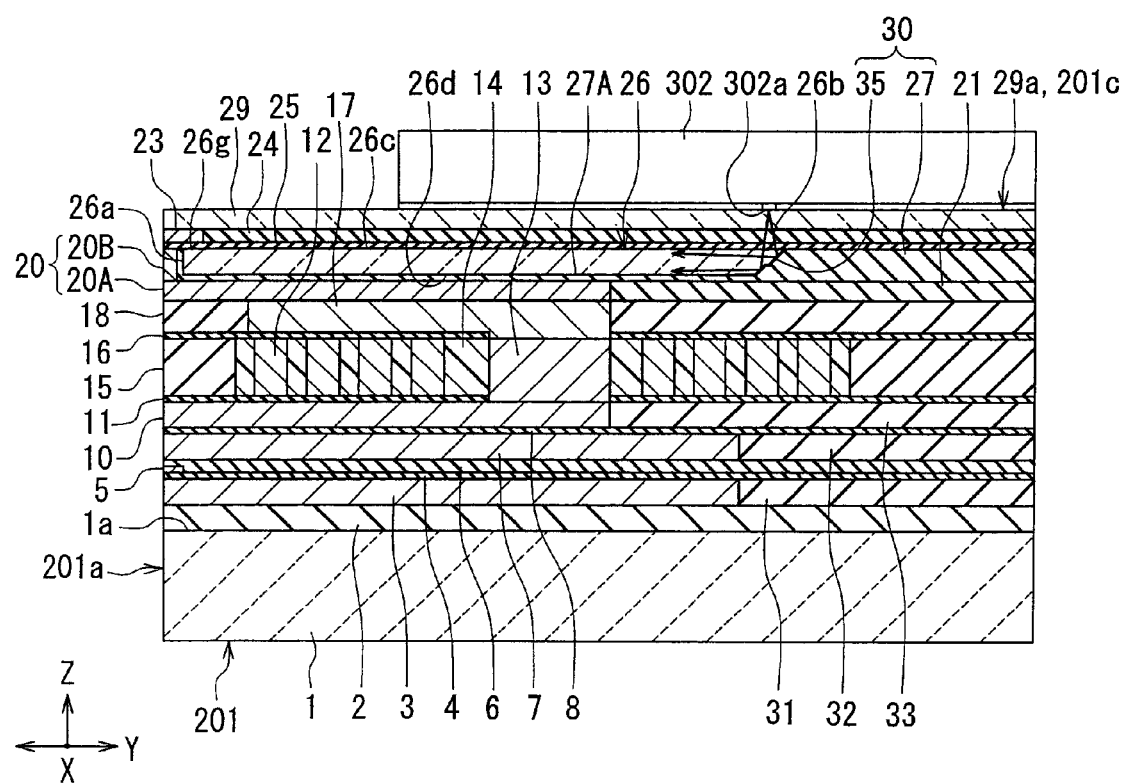
FIG. 29 is a cross-sectional view showing the configuration of a heat-assisted magnetic recording head of a first modification example of the first embodiment of the invention.

First and second modification examples of the present embodiment will now be described. FIG. 29 is a cross-sectional view showing the configuration of the heat-assisted magnetic recording head of the first modification example. The heat-assisted magnetic recording head of the first modification example is provided with a surface-emitting laser diode 302 shown in FIG. 29, instead of the laser diode 202 and the external mirror 203 of the heat-assisted magnetic recording head shown in FIG. 1 to FIG. 7.

In the first modification example, the laser diode 302 is fixed to the top surface 201c of the slider 201. The laser diode 302 has an emission part 302a on its bottom surface, and emits laser light downward from the emission part 302a. The laser light emitted from the emission part 302a passes through the clad layer 29, the clad layer 24 and the interposition layer 25, and enters the waveguide 26 from the top surface 26c to reach the rear end face 26b, where the laser light is reflected by the internal mirror 30 so as to travel through the waveguide 26 toward the medium facing surface 201a (the front end face 26a).

The first modification example allows the laser light emitted from the emission part 302a to be made incident directly on the clad layer 29 without reflection by the external mirror. The first modification example thus allows shortening the optical path from the laser diode 302 to the waveguide 26, and accordingly makes it possible to guide the light from the laser diode 302 to the opposed portion 26g of the outer surface of the waveguide 26 through a shorter path. According to the first modification example, it is therefore possible to reduce the energy loss of the light. Furthermore, the first modification example allows the laser diode 302 and the waveguide 26 to be put close to each other, which facilitates precise positioning of the laser diode 302 and the waveguide 26. Consequently, according to the first modification example, it is possible to reduce the energy loss of the light resulting from misalignment between the laser diode 302 and the waveguide 26.

Figure 30:
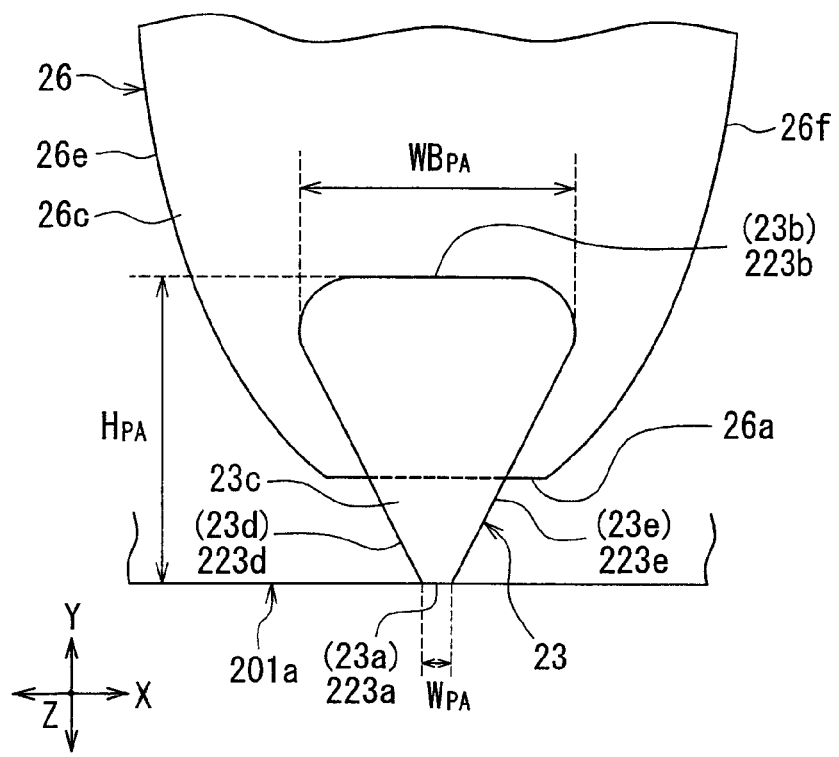
FIG. 30 is a plan view showing a part of the waveguide and the near-field light generating element of a heat-assisted magnetic recording head of a second modification example of the first embodiment of the invention.
Figure 31:
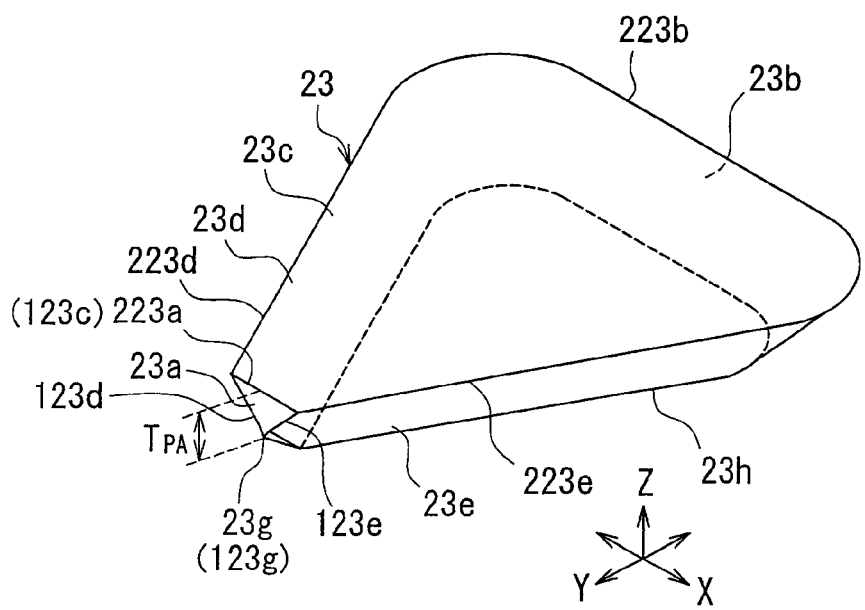
FIG. 31 is a perspective view of the near-field light generating element shown in FIG. 30.

The second modification example of the present embodiment will now be described. FIG. 30 is a plan view showing a part of the waveguide 26 and the near-field light generating element 23 of the second modification example. FIG. 31 is a perspective view of the near-field light generating element 23 shown in FIG. 30. In the near-field light generating element 23 of the second modification example, the side surfaces 23d and 23e have their respective portions that decrease in distance from each other in the track width direction with decreasing distance to the medium facing surface 201a. The corner portion between the side surface 23d and the second end face 23b and the corner portion between the side surface 23e and the second end face 23b are both rounded. In the second modification example, in particular, the side surfaces 23d and 23e excluding the above-mentioned two corner portions decrease in distance from each other in the track width direction with decreasing distance to the medium facing surface 201a.

The top surface 23c has a first edge 223a that is located at the top end of the first end face 23a, a second edge 223b that is located at the top end of the second end face 23b, a third edge 223d that is located at the top end of the side surface 23d, and a fourth edge 223e that is located at the top end of the side surface 23e. The third edge 223d and the fourth edge 223e have their respective portions that decrease in distance from each other in a direction parallel to the first edge 223a with decreasing distance to the first edge 223a. The corner portion between the second edge 223b and the third edge 223d and the corner portion between the second edge 223b and the fourth edge 223e are both rounded. In the second modification example, in particular, the third edge 223d and the fourth edge 223e excluding the above-mentioned two corner portions decrease in distance from each other in the direction parallel to the first edge 223a with decreasing distance to the first edge 223a.

The near-field light generating element 23 of the second modification example has a bottom surface 23h that is closer to the top surface 1a of the substrate 1. A part of the top surface 26c of the waveguide 26 is opposed to a part of the bottom surface 23h of the near-field light generating element 23 with the interposition layer 25 interposed therebetween. FIG. 30 shows an example in which the front end face 26a of the waveguide 26 is located away from the medium facing surface 201a. However, the front end face 26a may be located in the medium facing surface 201a.

As shown in FIG. 31, the near-field light generating element 23 of the second modification example is configured so that an area near the first end face 23a (hereinafter, referred to as front end vicinity area) has a bottom end that gets farther from the top surface 1a of the substrate 1 with decreasing distance to the first end face 23a. Only in the front end vicinity area of the near-field light generating element 23, each of the side surfaces 23d and 23e includes an upper part and a lower part that are continuous with each other, and the angle formed between the lower part of the side surface 23d and the lower part of the side surface 23e is smaller than that formed between the upper part of the side surface 23d and the upper part of the side surface 23e. In the area other than the front end vicinity area of the near-field light generating element 23, the side surfaces 23d and 23e are each plane or almost plane in shape.

The first end face 23a includes: a first side 123d that is located at an end of the first side surface 23d; a second side 123e that is located at an end of the second side surface 23e; a third side 123c that is located at an end of the top surface 23c; and a pointed tip 123g that is formed by contact of the first side 123d and the second side 123e with each other and constitutes the near-field light generating part 23g. Specifically, the near-field light generating part 23g refers to the pointed tip 123g and its vicinity in the end face 23a.

The first side 123d includes an upper part and a lower part that are continuous with each other. The second side 123e includes an upper part and a lower part that are continuous with each other. The angle formed between the lower part of the first side 123d and the lower part of the second side 123e is smaller than the angle formed between the upper part of the first side 123d and the upper part of the second side 123e.

As shown in FIG. 30, the length of the near-field light generating element 23 in the direction perpendicular to the medium facing surface 201a will be denoted by the symbol HPA; the width of the first end face 23a at its top edge will be denoted by the symbol WPA; and the maximum width of the near-field light generating element 23 in the track width direction (the X direction) will be denoted by the symbol WBPA. As shown in FIG. 31, the length of the first end face 23a in the direction perpendicular to the top surface 1a of the substrate 1 will be denoted by the symbol TPA. The length HPA of the near-field light generating element 23 in the direction perpendicular to the medium facing surface 201a is greater than the length TPA of the first end face 23a in the direction perpendicular to the top surface 1a of the substrate 1. WPA falls within the range of 50 to 350 nm, for example. TPA falls within the range of 60 to 350 nm, for example. HPA falls within the range of 0.25 to 2.5 Rm, for example. WBPA falls within the range of 0.25 to 2.5 Rna, for example.

The second modification example allows an increase in area of the opposed portion of the waveguide 26 opposed to a part of the coupling part (a part of the bottom surface 23h) of the outer surface of the near-field light generating element 23. Consequently, it is possible to excite more surface plasmons on the coupling part (the bottom surface 23h) of the near-field light generating element 23. According to the second modification example, in the near-field light generating element 23, the corner portion between the side surface 23d and the second end face 23b and the corner portion between the side surface 23e and the second end face 23b are both rounded. This can prevent near-field light from occurring from these corner portions. In the second modification example, the side surfaces 23d and 23e of the near-field light generating element 23, excluding the foregoing two corner portions, decrease in distance from each other in the track width direction with decreasing distance to the medium facing surface 201a. This configuration can concentrate surface plasmons excited on the bottom surface 23h while the surface plasmons propagate to the near-field light generating part 23g. According to the second modification example, it is therefore possible to concentrate more surface plasmons at the near-field light generating part 23g of pointed shape.

Second Embodiment

Figure 32:
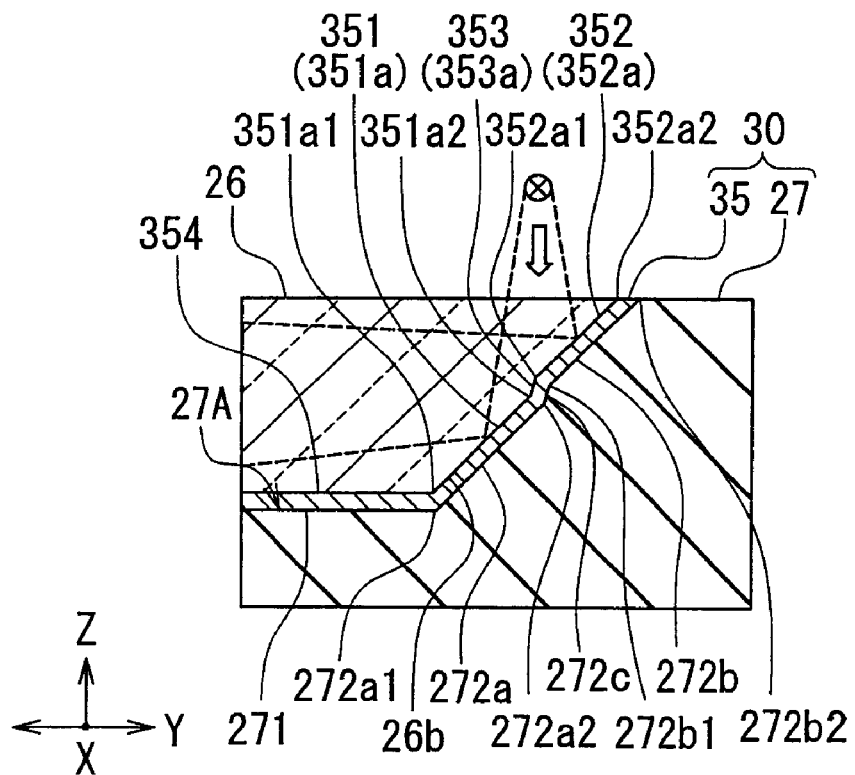
FIG. 32 is a cross-sectional view showing an internal mirror and its vicinity in a heat-assisted magnetic recording head according to a second embodiment of the invention.

A second embodiment of the present invention will now be described. FIG. 32 is a cross-sectional view showing the internal mirror and its vicinity in the heat-assisted magnetic recording head according to the present embodiment.

In the internal mirror 30 of the present embodiment, as shown in FIG. 32, the angle formed by the coupling surface 272c with respect to the direction perpendicular to the top surface 1a of the substrate 1 is smaller than the angle formed by each of the inclined surfaces 272a and 272b with respect to the direction perpendicular to the top surface 1a of the substrate 1. The angle formed by the coupling surface 353a with respect to the direction perpendicular to the top surface 1a of the substrate 1 is smaller than the angle formed by each of the reflecting surfaces 351a and 352a with respect to the direction perpendicular to the top surface 1a of the substrate 1.

A description will now be given of a manufacturing method for the heat-assisted magnetic recording head according to the present embodiment. The manufacturing method for the heat-assisted magnetic recording head according to the present embodiment includes the same steps as those of the manufacturing method for the heat-assisted magnetic recording head according the first embodiment up to the step of removing the etching mask 41 (FIG. 23).

Figure 33:
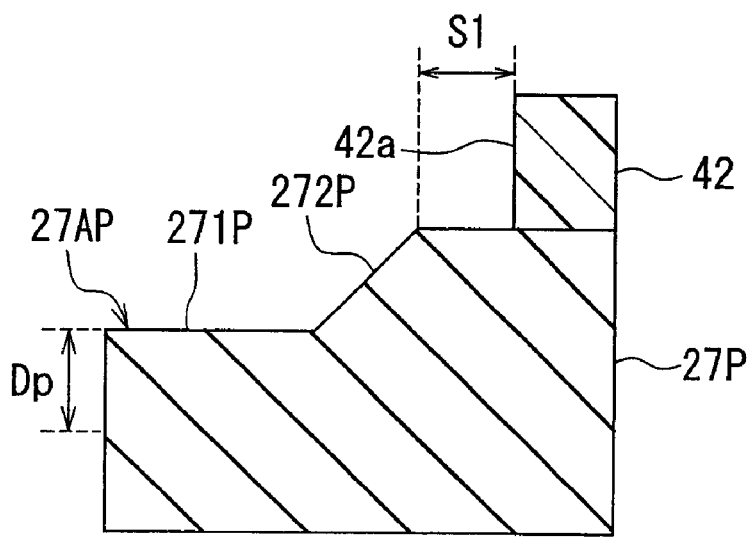
FIG. 33 is an explanatory diagram showing a step of a series of steps for forming the waveguide, the reflecting film support body, and the reflecting film of the second embodiment of the invention.

FIG. 33 shows the step after the removal of the etching mask 41. FIG. 33 shows a cross section of a part of a stack of layers in the process of manufacturing the heat-assisted magnetic recording head, the cross section being perpendicular to the medium facing surface 201a and the top surface 1a of the substrate 1. In FIG. 33, the portions lying closer to the substrate 1 than the initial support body 27P are omitted. In this step, the etching mask 42 is initially formed on the top surface of the initial support body 27P as in the step shown in FIG. 24. In the present embodiment, the side surface 42a of the etching mask 42 is located at a position different from that in the first embodiment. The subsequent steps are the same as those of the first embodiment.

In the present embodiment, the etching mask 42 is arranged so that the inclined surface 272b forms an angle of 45° with respect to the direction perpendicular to the top surface 1a of the substrate 1, and S1/Dp defined in the first embodiment is smaller than 1. If S1/Dp is smaller than 1, as shown in FIG. 32, the angle formed by the coupling surface 272c with respect to the direction perpendicular to the top surface 1a of the substrate 1 becomes smaller than the angle formed by each of the inclined surfaces 272a and 272b with respect to the direction perpendicular to the top surface 1a of the substrate 1. Consequently, the angle formed by the coupling surface 353a with respect to the direction perpendicular to the top surface 1a of the substrate 1 becomes smaller than the angle formed by each of the reflecting surfaces 351a and 352a with respect to the direction perpendicular to the top surface 1a of the substrate 1. According to the present embodiment, it is therefore possible to prevent the laser light incident on the reflecting film 35 from being reflected in part by the coupling surface 353a so as to return to the laser diode 202. The laser diode 202 can thus be prevented from being damaged by the laser light that returns to the laser diode 202.

If S1/Dp is too small, the distance between the reflecting surfaces 351a and 352a in the direction perpendicular to the top surface 1a of the substrate 1 becomes too large, and the laser light reflected by the reflecting film 35 thus has too large a diameter. In this point of view, it is preferred that S1/Dp be 0.8 or above.

The remainder of configuration, function and effects of the present embodiment are similar to those of the first embodiment.

Third Embodiment

Figure 34:
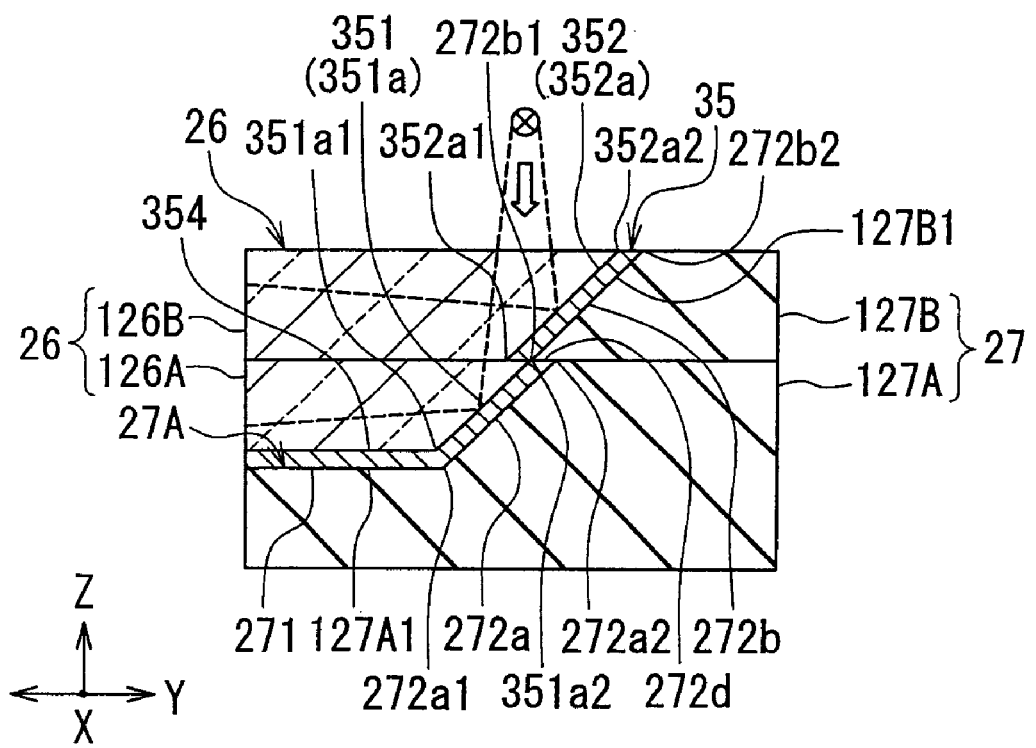
FIG. 34 is a cross-sectional view showing an internal mirror and its 20 vicinity in a heat-assisted magnetic recording head according to a third embodiment of the invention.

A third embodiment of the present invention will now be described. FIG. 34 is a cross-sectional view showing the internal mirror and its vicinity in the heat-assisted magnetic recording head according to the present embodiment. The reflecting film support body 27 of the present embodiment includes a first layer 127A, and a second layer 127B lying on the first layer 127A. The first layer 127A has a groove 127A1 that opens in the top surface. The groove 127A1 has the bottom 271 and the first inclined surface 272a. The second layer 127B has a penetrating opening 127B1.

The opening 127B1 has the second inclined surface 272b. The groove 127A1 and the opening 127B2 constitute the groove 27A. The groove 27A of the present embodiment has a coupling surface 272d, which is a part of the bottom surface of the second layer 127B, instead of the coupling surface 272c of the second embodiment.

The inclined surfaces 272a and 272b of the present embodiment are arranged so as to overlap each other as viewed in the direction perpendicular to the top surface 1a of the substrate 1. That is, in the present embodiment, the front end 272b1 of the inclined surface 272b is located closer to the medium facing surface 201a than is the rear end 272a2 of the inclined surface 272a. The coupling surface 272d faces toward the top surface 1a of the substrate 1, and lies in parallel with the top surface 1a of the substrate 1.

The reflecting film 35 of the present embodiment has the first portion 351 located on the first inclined surface 272a, the second portion 352 located on the second inclined surface 272b, and the portion 354 located on the bottom 271 of the groove 27A and coupled to the first portion 351. The reflecting film 35 does not have any coupling portion that couples the first portion 351 to the second portion 352, however. The first portion 351 and the second portion 352 are separated from each other. The reflecting film 35 need not have the portion 354. The reflecting surfaces and 352a of the present embodiment are arranged so as to overlap each other as seen in the direction perpendicular to the top surface 1a of the substrate 1. That is, in the present embodiment, the front end 352a1 of the reflecting surface 352a is located closer to the medium facing surface 201a than is the rear end 351a2 of the reflecting surface 351a.

The waveguide 26 of the present embodiment includes a first layer 126A that is closer to the top surface 1a of the substrate 1 and a second layer 126B that is farther from the top surface 1a of the substrate 1. At least part of the first layer 126A is accommodated in the groove 127A1. At least part of the second layer 126B is accommodated in the opening 127B1.

Although not shown in the drawings, the second layer 20B of the magnetic pole 20 of the present embodiment includes a first portion that is closer to the top surface 1a of the substrate 1 and a second portion that is farther from the top surface 1a of the substrate 1.

A manufacturing method for the heat-assisted magnetic recording head according to the present embodiment will now be described. The manufacturing method for the heat-assisted magnetic recording head according to the present embodiment includes the same steps as those of the manufacturing method for the heat-assisted magnetic recording head according to first embodiment up to the step of flattening the first layer 20A of the magnetic pole 20 and the nonmagnetic layer 21 at the top (FIG. 14A and FIG. 14B).

Figure 35:
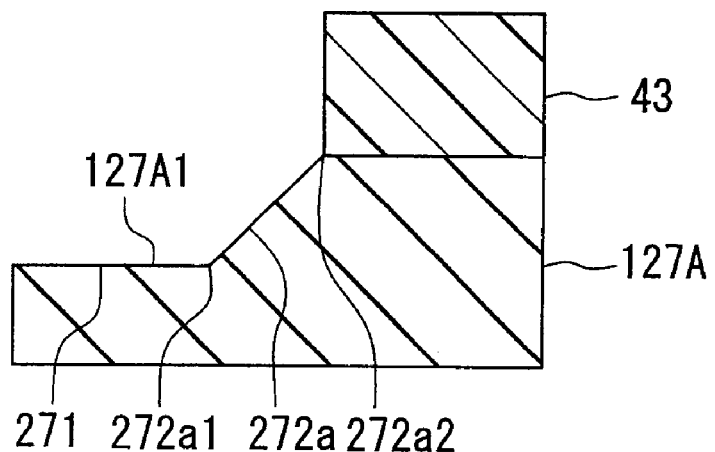
FIG. 35 is an explanatory diagram showing a step of a series of steps for forming the waveguide, the reflecting film support body, and the reflecting film of the third embodiment of the invention.

FIG. 35 shows the step after the first layer 20A of the magnetic pole 20 and the nonmagnetic layer 21 are flattened at the top. FIG. 35 shows a cross section of a part of a stack of layers in the process of manufacturing the heat-assisted magnetic recording head, the cross section being perpendicular to the medium facing surface 201a and the top surface 1a of the substrate 1. In FIG. 35, the portions lying closer to the substrate 1 than the first layer 127A of the reflecting film support body 27 are omitted. In this step, although not shown, the first portion of the second layer 20B is initially formed on the first layer 20A by frame plating, for example. Next, an initial first layer, which is intended to undergo the formation of the inclined surface 272a therein later to thereby become the first layer 127A, is formed over the entire top surface of the stack. The initial first layer is then polished by, for example, CMP until the first portion of the second layer 20B is exposed.

This flattens the first portion of the second layer 20B and the initial first layer at the top.

Next, a first etching mask 43 is formed on the initial first layer. The etching mask 43 is formed by patterning a photoresist layer by photolithography, for example. The etching mask 43 has an opening that has a shape corresponding to the planar shape of the first layer 126A of the waveguide 26. The etching mask 43 covers a part of the initial first layer except the area where the inclined surface 272a is to be formed later as viewed in the direction perpendicular to the top surface 1a of the substrate 1.

Using the etching mask 43, the initial first layer is then taper-etched by RIE. This step will be referred to as a first etching step. The etching conditions employed in this step are the same as those employed in the first etching step of the first embodiment. As shown in FIG. 35, the etching of the initial first layer forms the groove 127A1 in the initial first layer. This also forms the bottom 271 and the inclined surface 272a, so that the initial first layer becomes the first layer 127A.

Figure 36:
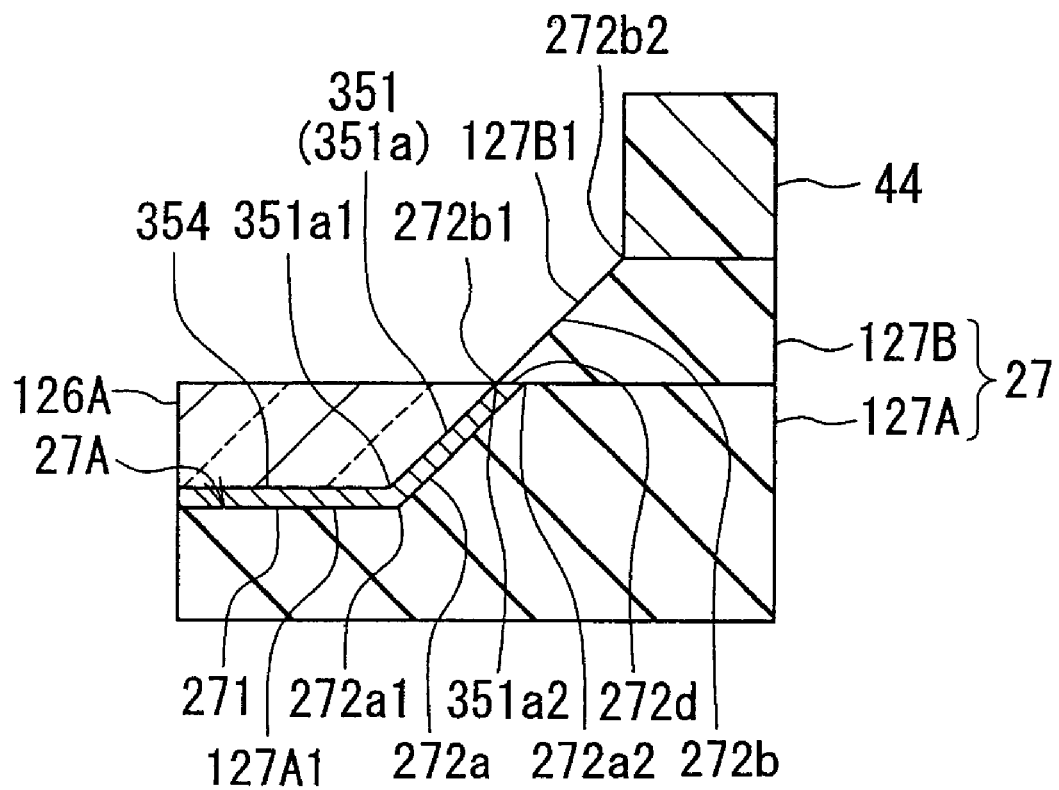
FIG. 36 is a cross-sectional view showing a step that follows the step of FIG. 35.

FIG. 36 shows the next step. FIG. 36 shows a cross section of a part of a stack of layers in the process of manufacturing the heat-assisted magnetic recording head, the cross section being perpendicular to the medium facing surface 201a and the top surface 1a of the substrate 1. In FIG. 36, the portions lying closer to the substrate 1 than the first layer 127A of the reflecting film support body 27 are omitted. In this step, first, the etching mask 43 is removed. Next, a metal film that is to be made into the first portion 351 and the portion 354 of the reflecting film 35 later is formed over the inclined surface 272a and a part of the bottom 271. The metal film is formed also on a part of the top surface of the first layer 127A. Next, a dielectric layer that is to become the first layer 126A of the waveguide 26 later is formed over the entire top surface of the stack. The dielectric layer and the metal film are then polished by, for example, CMP, until the first portion of the second layer 20B and the first layer 127A of the reflecting film support body 27 are exposed. This flattens the first portion of the second layer 20B, the first layer 127A, and the dielectric layer at the top. As a result, the dielectric layer left in the groove 127A1 makes the first layer 126A of the waveguide 26. The metal film left in the groove 127A1 makes the first portion 351 and the portion 354 of the reflecting film 35.

Next, although not shown in the drawings, the second portion of the second layer 20B is formed on the first portion of the second layer 20B by frame plating, for example. Next, an initial second layer, which is intended to undergo the formation of the inclined surface 272b therein later to thereby become the second layer 127B, is formed over the entire top surface of the stack. The initial second layer is then polished by, for example, CMP, until the second portion of the second layer 20B is exposed. This flattens the second portion of the second layer 20B and the initial second layer at the top.

Next, a second etching mask 44 is formed on the top surface of the initial second layer. The etching mask 44 is formed by patterning a photoresist layer by photolithography, for example. The etching mask 44 has an opening that has a shape corresponding to the planar shape of the second layer 126B of the waveguide 26. The etching mask 44 covers a part of the initial second layer except the area where the inclined surfaces 272a and 272b are to be formed later as viewed in the direction perpendicular to the top surface 1a of the substrate 1. Using the etching mask 44, the initial second layer is then taper-etched by RIE. This step will be referred to as a second etching step. The etching conditions employed in this step are the same as those employed in the second etching step of the first embodiment. As shown in FIG. 36, the etching of the initial second layer forms the opening 127B1 in the initial second layer. This also forms the inclined surface 272b, so that the initial second layer becomes the second layer 127B.

The steps after the step of FIG. 36 up to the formation of the second layer 126B of the waveguide 26 and the second portion 352 of the reflecting film 35 will be described with reference to FIG. 34. In this step, first, the etching mask 44 is removed. Next, a metal film that is to become the second portion 352 of the reflecting film 35 later is formed on the inclined surface 272b. The metal film is formed also on a part of the top surface of the second layer 127B. Next, a dielectric layer that is to become the second layer 126B of the waveguide 26 later is formed over the entire top surface of the stack. The dielectric layer and the metal film are then polished by, for example, CMP until the second portion of the second layer 20B and the second layer 127B are exposed. This flattens the second portion of the second layer 20B, the second layer 127B, and the dielectric layer at the top. As a result, the dielectric layer left in the opening 127B1 makes the second layer 126B of the waveguide 26. The metal film left in the opening 127B1 makes the second portion 352 of the reflecting film 35. The subsequent steps are the same as those of the first embodiment.

In the present embodiment, the reflecting surfaces 351a and 352a are arranged so as to overlap each other as seen in the direction perpendicular to the top surface 1a of the substrate 1. Consequently, according to the present embodiment, it is possible to prevent part of the laser light incident on the reflecting film 35 from returning to the laser diode 202. The laser diode 202 can thus be prevented from being damaged by the laser light that returns to the laser diode 202.

In the present embodiment, the reflecting film support body 27 may include three or more stacked layers having respective inclined surfaces, and the reflecting film 35 may include three or more portions located on the respective inclined surfaces of the three or more layers of the reflecting film support body 27. The respective inclined surfaces of the layers of the reflecting film support body 27 are formed by taper-etching. In such a case, the total size of three or more reflecting surfaces of the reflecting film 35 can be made greater both in the direction perpendicular to the top surface 1a of the substrate 1 and in the direction perpendicular to the medium facing surface 201a.

The remainder of configuration, function and effects of the present embodiment are similar to those of the second embodiment.

It should be appreciated that the present invention is not limited to the foregoing embodiments, and various modifications may be made thereto.

For example, in the first to third embodiments, the laser diode 202, the external mirror 203, the internal mirror 30 and the waveguide 26 may be arranged so that the direction of travel of the laser light emitted from the emission part 222a of the laser diode 202 and the direction of travel of the laser light reflected by the internal mirror 30 are parallel to each other.

In the present invention, the magnetic pole 20 need not include the second layer 20B. The waveguide 26 may be located farther from the top surface 1a of the substrate 1 than is the near-field light generating element 23.

In the present invention, the near-field light generating element 23 may have a shape other than the shapes shown in FIG. 9 and FIG. 31.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A manufacturing method for a heat-assisted magnetic recording head that comprises:
a medium facing surface that faces a recording medium;
a magnetic pole that has an end face located in the medium facing surface, for producing a recording magnetic field for recording data on the recording medium;
a waveguide that allows light to propagate therethrough;
a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon;
an internal mirror; and
a substrate having a top surface, wherein:
the magnetic pole, the waveguide, the near-field light generating element, and the internal mirror are located above the top surface of the substrate;
the internal mirror includes a reflecting film support body and a reflecting film, the reflecting film support body including at least one layer, the reflecting film being supported by the reflecting film support body, the internal mirror reflecting light that comes from above the waveguide so that the reflected light travels through the waveguide toward the medium facing surface,
the manufacturing method comprising the steps of:
forming the magnetic pole;
forming the internal mirror;
forming the waveguide; and
forming the near-field light generating element, wherein:
the step of forming the internal mirror includes the step of forming the reflecting film support body and the step of forming the reflecting film;
the reflecting film support body includes a first inclined surface and a second inclined surface, each of the first and second inclined surfaces having a front end and a rear end;
the rear end of the first inclined surface is located farther from the medium facing surface and farther from the top surface of the substrate than is the front end of the first inclined surface;
the front end of the second inclined surface is located farther from the medium facing surface and farther from the top surface of the substrate than is the front end of the first inclined surface;
the rear end of the second inclined surface is located farther from the medium facing surface and farther from the top surface of the substrate than are the rear end of the first inclined surface and the front end of the second inclined surface;
the step of forming the reflecting film support body includes the steps of:
forming an initial support body that is intended to undergo the formation of the first and second inclined surfaces therein later to thereby become the reflecting film support body; and
etching the initial support body so that the first and second inclined surfaces are formed in the initial support body and the initial support body thereby becomes the reflecting film support body;
the step of etching the initial support body includes:
the step of forming a first etching mask that covers a part of the initial support body except an area where the first inclined surface is to be formed later as viewed in a direction perpendicular to the top surface of the substrate;
the first etching step of taper-etching the initial support body by reactive ion etching using the first etching mask;
the step of removing the first etching mask;
the step of forming a second etching mask that covers a part of the initial support body except an area where the first and second inclined surfaces are to be formed later as viewed in the direction perpendicular to the top surface of the substrate;

the second etching step of taper-etching the initial support body by reactive ion etching using the second etching mask; and the step of removing the second etching mask;

after the second etching step, the first and second inclined surfaces are completed and the initial support body thereby becomes the reflecting film support body; and the reflecting film includes a first portion located on the first inclined surface and a second portion located on the second inclined surface, the first portion including a first reflecting surface, the second portion including a second reflecting surface.

2. The manufacturing method for a heat-assisted magnetic recording head according to claim 1, wherein:

with respect to a virtual plane that includes the first inclined surface, the second inclined surface is offset in a direction perpendicular to the first inclined surface;

each of the first and second reflecting surfaces has a front end and a rear end;

the rear end of the first reflecting surface is located farther from the medium facing surface and farther from the top surface of the substrate than is the front end of the first reflecting surface;

the front end of the second reflecting surface is located farther from the medium facing surface and farther from the top surface of the substrate than is the front end of the first reflecting surface;

the rear end of the second reflecting surface is located farther from the medium facing surface and farther from the top surface of the substrate than are the rear end of the first reflecting surface and the front end of the second reflecting surface; and with respect to a virtual plane that includes the first reflecting surface, the second reflecting surface is offset in a direction perpendicular to the first reflecting surface.

3. The manufacturing method for a heat-assisted magnetic recording head according to claim 1, wherein each of the first and second reflecting surfaces forms an angle of 45° with respect to the direction perpendicular to the top surface of the substrate.

4. The manufacturing method for a heat-assisted magnetic recording head according to claim 1, wherein the initial support body is made of alumina, and the first and second etching steps use an etching gas that contains $BCl_3$, $Cl_2$, and one of $N_2$ and $CF_4$.

5. The manufacturing method for a heat-assisted magnetic recording head according to claim 1, wherein:

the first etching step forms an initial inclined surface in the initial support body, the initial inclined surface being inclined with respect to the direction perpendicular to the top surface of the substrate;

the second etching step forms the first inclined surface and the second inclined surface, the first inclined surface being formed by etching a part of the initial support body under the initial inclined surface, the second inclined surface being formed by etching a part of the initial support body not etched in the first etching step.

6. The manufacturing method for a heat-assisted magnetic recording head according to claim 5, wherein:

each of the first and second etching masks has a side surface that is closer to the medium facing surface; and the side surface of the second etching mask is located at a position farther from the medium facing surface by 0.8 to 1.2 times an etching depth of the second etching step, than a position where the side surface of the first etching mask is located.

7. The manufacturing method for a heat-assisted magnetic recording head according to claim 1, wherein the reflecting film further includes a coupling portion that couples the first portion to the second portion, the coupling portion including a coupling surface that couples the first reflecting surface to the second reflecting surface.

8. The manufacturing method for a heat-assisted magnetic recording head according to claim 7, wherein an angle formed by the coupling surface with respect to the direction perpendicular to the top surface of the substrate is greater than an angle formed by each of the first and second reflecting surfaces with respect to the direction perpendicular to the top surface of the substrate.

9. The manufacturing method for a heat-assisted magnetic recording head according to claim 7, wherein an angle formed by the coupling surface with respect to the direction perpendicular to the top surface of the substrate is smaller than an angle formed by each of the first and second reflecting surfaces with respect to the direction perpendicular to the top surface of the substrate.

10. The manufacturing method for a heat-assisted magnetic recording head according to claim 1, wherein:

the reflecting film support body includes a first layer having the first inclined surface and a second layer having the second inclined surface;

the step of forming the initial support body includes: the step of forming an initial first layer before the step of forming the first etching mask, the initial first layer being intended to undergo the formation of the first inclined surface therein later to thereby become the first layer; and the step of forming an initial second layer between the step of removing the first etching mask and the step of forming the second etching mask, the initial second layer being intended to undergo the formation of the second inclined surface therein later to thereby become the second layer;

the first etching mask is formed on the initial first layer;

the first etching step forms the first inclined surface by taper-etching the initial first layer;

the second etching mask is formed on the initial second layer; and the second etching step forms the second inclined surface by taper-etching the initial second layer.

* * * * *